_United States Patent_ [19]

Ukai et al.

[11] Patent Number: 5,809,516
[45] Date of Patent: Sep. 15, 1998

[54] ALLOCATION METHOD OF PHYSICAL REGIONS OF A DISC ARRAY TO A PLURALITY OF LOGICALLY-SEQUENTIAL DATA, ADAPTED FOR INCREASED PARALLEL ACCESS TO DATA

[75] Inventors: Tohiyuki Ukai; Toyohiko Kagimasa, both of Sagamihara; Toshiaki Mori, Hachioji; Masaaki Shimizu, Yokohama, all of Japan

[73] Assignee: Hitachi, Ltd., Tokyo, Japan

[21] Appl. No.: 578,479

[22] Filed: Dec. 26, 1995

[30]     Foreign Application Priority Data

Dec. 28, 1994   [JP]   Japan ................................. 6-327923

[51] Int. Cl.⁶ ..................................................... G06F 9/45
[52] U.S. Cl. ........................... 711/114; 711/113; 711/156; 711/162; 711/168
[58] Field of Search .............................. 395/182.04, 440, 395/441, 200.09; 364/578

[56]              References Cited

U.S. PATENT DOCUMENTS

| 5,471,408 | 11/1995 | Takamoto et al. ...................... 364/578 |
| 5,537,534 | 7/1996 | Voigt et al. ......................... 395/182.04 |
| 5,542,065 | 7/1996 | Burkes et al. .......................... 395/441 |
| 5,583,995 | 12/1996 | Gardner et al. ..................... 395/200.09 |
| 5,586,291 | 12/1996 | Lasker et al. .......................... 395/440 |
| 5,600,783 | 2/1997 | Kakata et al. ..................... 395/182.04 |

FOREIGN PATENT DOCUMENTS 4-264910   9/1992   Japan .

OTHER PUBLICATIONS

D. Patterson et al., "A Case for Redundant Arrays of Inexpensive Disks (RAID)", ACM SIGMOD Conference, Jun. 1988, pp. 109–116.
"The Design and Implementation of the 4.3 BSD UNIX Operating System", Addison–Wesley Publishing Company, 1989, pp. 169–221.
"Extent–like Performance from a UNIX File System", USENIX Winder '91, 1991, pp. 33–43.
"Disc Array Device with its Improved Performance Becomes Kernel of a Distributed System", Nikkei Electronics, No. 579, Apr. 26, 1993, pp. 77–103.

*Primary Examiner*—Tod R. Swann
*Assistant Examiner*—Fred F. Tzeng
*Attorney, Agent, or Firm*—Antonelli, Terry, Stout & Kraus, LLP

[57]                  ABSTRACT

Logical blocks are allocated to a plurality of logically sequential blocks of data by referring to disc array configuration information and a list of candidate logical blocks that may be allocated, so that the drives for retaining the logical blocks assigned to the blocks of data and the drives for holding the parities for these logical blocks will be all different. Thus, a total number of drives which operate in parallel for executing sequential writes to the disc array can be increased to a maximum extent.

38 Claims, 29 Drawing Sheets

FIG. 5

22 UNALLOCATED LOGICAL BLOCK INFORMATION

0···ALLOCATED
1···UNALLOCATED

| BIT MAP INFORMATION | 00000000 | 00000000 | 11111111 | 11111111 | ... |
|---|---|---|---|---|---|
| LOGICAL BLOCK NO. | 0 | 1 | 2 | 3 | ... |

FIG. 6

24 ALLOCATION CANDIDATE LOGICAL BLOCK LIST

| |
|---|
| POINTER TO NEXT ALLOCATION CANDIDATE LOGICAL BLOCK LIST |
| POINTER TO SEARCH START POINT(BLOCK NO.#s) IN ALLOCATION CANDIDATE LOGICAL BLOCK LIST |
| POINTER TO SEARCH END POINT(BLOCK NO.#s-1) IN ALLOCATION CANDIDATE LOGICAL BLOCK LIST |
| ALLOCATION CANDIDATE LOGICAL BLOCK NO.#0 |
| POINTER TO ALLOCATION CANDIDATE LOGICAL BLOCK NO.#1 |
| ALLOCATION CANDIDATE LOGICAL BLOCK NO.#1 |
| POINTER TO ALLOCATION CANDIDATE LOGICAL BLOCK NO.#2 |
| ⋮ |
| ALLOCATION CANDIDATE LOGICAL BLOCK NO.#s-1 |
| 0 |
| ALLOCATION CANDIDATE LOGICAL BLOCK NO.#s |
| POINTER TO ALLOCATION CANDIDATE LOGICAL BLOCK NO.#s+1 |
| ⋮ |
| POINTER TO ALLOCATION CANDIDATE LOGICAL BLOCK NO.#n-1 |
| ALLOCATION CANDIDATE LOGICAL BLOCK NO.#n-1 |
| ALLOCATION CANDIDATE LOGICAL BLOCK NO.#0 |

24 TYPICAL ALLOCATION CANDIDATE LOGICAL BLOCK LIST

FIG. 8

27 LOGICAL/PHYSICAL BLOCK NO. TRANSLATION TABLE

| INTRA-DRIVE PHYSICAL BLOCK NO. | DRIVE INFORMATION ||||| 
|---|---|---|---|---|---|
| | DRIVE #D0 | DRIVE #D1 | DRIVE #D2 | DRIVE #D3 | DRIVE #D4 |
| #Y0 | #L0 | #L1 | #L2 | #L3 | P |
| #Y1 | #L4 | #L5 | #L6 | P | #L7 |
| #Y2 | #L8 | #L9 | P | #L10 | #L11 |
| #Y3 | #L12 | P | #L13 | #L14 | #L15 |
| #Y4 | P | #L16 | #L17 | #L18 | #L19 |
| #Y5 | #L20 | #L21 | #L22 | #L23 | P |
| #Y6 | #L24 | #L25 | #L26 | P | #L27 |
| #Y7 | #L28 | #L29 | P | #L30 | #L31 |
| #Y8 | #L32 | P | #L33 | #L34 | #L35 |
| #Y9 | P | #L36 | #L37 | #L38 | #L39 |
| #Y10 | #L40 | #L41 | #L42 | #L43 | P |
| #Y11 | #L45 | #L46 | #L47 | P | #L48 |
| ⋮ | ⋮ | ⋮ | ⋮ | ⋮ | ⋮ |

FIG. 9

23 DISC ARRAY CONFIGURATION INFORMATION

| RAID LEVEL INFORMATION |
| DATA DRIVE COUNT |
| PARITY DRIVE COUNT |
| PARITY DRIVE LOCATION INFORMATION |
| PRESENCE OF DRIVE LEVEL CACHE |

FIG. 10

23 DISC ARRAY CONFIGURATION INFORMATION

| 5 | |
|---|---|
| 4 | |
| 1 | |
| 4 | -1 |
| 0 | |

18 PROCESS FOR CREATING ALLOCATION CANDIDATE LOGICAL BLOCK LIST GROUP

28 ALLOCATION CANDIDATE LOGICAL BLOCK GROUPS

<u>19</u> PROCESS FOR CREATING ALLOCATION CANDIDATE LOGICAL BLOCK GROUP TABLE

<u>28</u> ALLOCATION CANDIDATE LOGICAL BLOCK GROUP TABLE

| OS-ALLOCATED LOGICAL BLOCK NO. | ALLOCATION CANDIDATE LOGICAL BLOCK GROUP NO. | REALLOCATED LOGICAL BLOCK NO. |
|---|---|---|
| #Li0—#Li4 | #C0 | #Ld0, #Ld7, #Ld10, #Ld13, #Ld16 |
| #Li5—#Li9 | #C1 | #Ld1, #Ld4, #Ld11, #Ld14, #Ld17 |
| #Li10—#Li14 | #C2 | #Ld2, #Ld5, #Ld8, #Ld15, #Ld18 |
| #Li15—#Li19 | #C3 | #Ld3, #Ld6, #Ld9, #Ld12, #Ld19 |
| ⋮ | ⋮ | ⋮ |

29 LOGICAL BLOCK TRANSLATION MAP

| OS-ALLOCATED LOGICAL BLOCK NO. | REALLOCATED LOGICAL BLOCK NO. |
|---|---|
| #Li0 | #Ld0 |
| #Li1 | #Ld10 |
| #Li2 | #Ld16 |
| #Li3 | #Ld7 |
| #Li4 | #Ld13 |
| #Li5 | #Ld4 |
| #Li6 | #Ld11 |
| #Li7 | #Ld14 |
| #Li8 | #Ld17 |
| #Li9 | #Ld1 |
| #Li10 | #Ld8 |
| #Li11 | #Ld15 |
| #Li12 | #Ld18 |
| #Li13 | #Ld2 |
| #Li14 | #Ld5 |
| #Li15 | #Ld19 |
| #Li16 | #Ld6 |
| #Li17 | #Ld12 |
| #Li18 | #Ld3 |
| #Li19 | #Ld9 |
| ⋮ | ⋮ |

241    242

27 LOGICAL/PHYSICAL BLOCK NO. TRANSLATION TABLE

| INTRA-DRIVE PHYSICAL BLOCK NO. (241) | DRIVE INFORMATION (242) | | | | |
|---|---|---|---|---|---|
| | DRIVE #D0 | DRIVE #D1 | DRIVE #D2 | DRIVE #D3 | DRIVE #D4 |
| #Y0 | #L0 | #L1 | #L2 | #L3 | P |
| #Y1 | #L4 | #L5 | #L6 | P | #L7 |
| #Y2 | #L8 | #L9 | P | #L10 | #L11 |
| #Y3 | #L12 | P | #L13 | #L14 | #L15 |
| #Y4 | P | #L16 | #L17 | #L18 | #L19 |
| #Y5 | #L20 | #L21 | #L22 | #L23 | P |
| #Y6 | #L24 | #L25 | #L26 | P | #L27 |
| #Y7 | #L28 | #L29 | P | #L30 | #L31 |
| #Y8 | #L32 | P | #L33 | #L34 | #L35 |
| #Y9 | P | #L36 | #L37 | #L38 | #L39 |
| #Y10 | #L40 | #L41 | #L42 | #L43 | P |
| #Y11 | #L45 | #L46 | #L47 | P | #L48 |
| ⋮ | ⋮ | ⋮ | ⋮ | ⋮ | ⋮ |

29 LOGICAL BLOCK TRANSLATION MAP

DISC MANAGEMENT LOGICAL BLOCK NO.
Ld16

FIG. 38

LOGICAL BLOCK ALLOCATION
SEQUENCE IN EACH LOGICAL UNIT

|     | #D0 | #D1 | #D2 | #D3 | #D4 |
|-----|-----|-----|-----|-----|-----|
| #U0 | 0   | 5   | 14  | 18  | P   |
|     | 7   | 11  | 19  | P   | 1   |
|     | 13  | 15  | P   | 2   | 9   |
|     | 16  | P   | 3   | 6   | 10  |
|     | P   | 4   | 8   | 12  | 17  |
|     | ⋮   | ⋮   | ⋮   | ⋮   | ⋮   |
| #U1 | 3   | 8   | 12  | 16  | P   |
|     | 5   | 14  | 17  | P   | 4   |
|     | 11  | 18  | P   | 0   | 7   |
|     | 19  | P   | 1   | 9   | 13  |
|     | P   | 2   | 6   | 10  | 15  |
|     | ⋮   | ⋮   | ⋮   | ⋮   | ⋮   |
| #U2 | 1   | 6   | 10  | 19  | P   |
|     | 8   | 12  | 15  | P   | 2   |
|     | 14  | 16  | P   | 3   | 5   |
|     | 17  | P   | 4   | 7   | 11  |
|     | P   | 0   | 9   | 13  | 18  |
|     | ⋮   | ⋮   | ⋮   | ⋮   | ⋮   |
| #U3 | 4   | 9   | 13  | 17  | P   |
|     | 6   | 10  | 18  | P   | 0   |
|     | 12  | 19  | P   | 1   | 8   |
|     | 15  | P   | 2   | 5   | 14  |
|     | P   | 3   | 7   | 11  | 16  |
|     | ⋮   | ⋮   | ⋮   | ⋮   | ⋮   |
| #U4 | 2   | 7   | 11  | 15  | P   |
|     | 9   | 13  | 16  | P   | 3   |
|     | 10  | 17  | P   | 4   | 6   |
|     | 18  | P   | 0   | 8   | 12  |
|     | P   | 1   | 5   | 14  | 19  |
|     | ⋮   | ⋮   | ⋮   | ⋮   | ⋮   |

ALLOCATION METHOD OF PHYSICAL REGIONS OF A DISC ARRAY TO A PLURALITY OF LOGICALLY-SEQUENTIAL DATA, ADAPTED FOR INCREASED PARALLEL ACCESS TO DATA

BACKGROUND OF THE INVENTION

The present invention relates to a method for allocating data storage regions of a disc array to the data to be written to that disc array.

One way to improve the performance of disc storage devices is the use of a disc array comprising numerous disc drives.

D. Patterson, G. Gibson and R. H. Katz, in their paper "A Case for Redundant Arrays of Inexpensive Disks (RAID)," ACM SIGMOD Conference, June 1988, pp. 109–116 (called the cited reference 1 hereunder), classifies various disc arrays into a number of RAID levels in terms of data storage methods. The paper reports on the performance and reliability of each of the RAID levels classified and reviewed.

The disc array constitutes a disc storage device made up of a large number of disc drives. As such, the disc array has numerous parts that are likely to result in a higher rate of failures. To bypass the problem, parity is created from stored data and is held in a disc drive for parity purposes, the parity disc drive being independent of disc drives for data storage purposes. If any of the data storage disc drives develops a failure, the data in the failed disc drive is recovered from the data in the remaining data disc drives and from the parity data in the parity disc drive. Although a number of error correcting codes are currently used for error recovery, the description that follows will concentrate on the parity check code, the most widely used error correction method, for purpose of simplification and illustration. The ensuing description, together with the embodiments included therein, will apply to other error correcting codes as well. Parity is generated by exclusive-OR'ing the relevant bits representing a plurality of data items. The combination of the multiple data items used to generate parity and the parity thus generated are referred to as a parity group. A group of disc drives to hold such parity groups is called a logical group. As shown in FIG. 39, such parity groups are retained in the corresponding storage regions illustratively across a plurality of disc drives #D0 through #D4.

In particular, the disc array on the fifth level RAID (called the RAID level 5 hereunder) has a plurality of disc drives operated in parallel. In a RAID level 5 setup wherein write data is given by a host, that data is generally written as a single data item to a single disc drive. The new parity of the parity group to which the write data belongs is not generated from all data constituting the parity group in question but by use of the following simple method: The parity of the parity group to which the write data belongs (i.e., old parity) and the data to be replaced by the write data (i.e., old data) are read from the disc array. The old data and old parity thus retrieved and the new write data supplied by the host are exclusive-OR'ed, whereby a new parity is generated. Generation of the new parity will now be described more specifically with reference to FIG. 39. Numbers #L0, etc. in FIG. 39 represent logical block numbers defined by the disc array with respect to block-by-block data storage regions (called physical blocks) in the disc drives configured. For example, suppose that a data block (#T1) held in the physical block having a logical block number #L1 (called the physical block #L1 hereunder) is to be updated. In that case, the old parity P is read from the parity group to which belongs the physical block #L1 storing the old data #T1 and the new data #T1. The old parity P, old data #T1 and new data #T1' are exclusive-OR'ed to generate new parity P'. The new data #T1' and new parity P' are then used to update the old data #T1 and old parity P.

To adopt the above parity update method for a RAID level 5 disc array requires that parity reads and writes are to be carried out within the parity group of the data in question when a data write request is executed. In that case, the parity update method is implemented by changing the parity storage disc drive cyclically for each parity group, as depicted in FIG. 39. This averts the concentration of accesses to the same disc drive for parity reads and writes.

In the RAID level 5 disc array, as described, a plurality of write requests are executed in parallel provided the disc drives holding the requested data and the disc drives that store the parity regarding those data do not coincide. Likewise, a plurality of read requests are carried out in parallel provided the disc drives holding the requested data do not coincide. Thus the RAID level 5 disc array may be regarded as fit for high traffic random access applications. Because application programs often demand high traffic performance, RAID level 5 setups are coming into general use in the form of spare discs.

The disc array is generally used by its host as follows: The operating system (OS), the basic software of the host to manage I/O devices, presents the user with data to be handled through the I/O devices in the abstract form of files. The operating system converts the user's I/O requests into requests that can be handled by the I/O devices. The host handles data in units of blocks for its I/O requests to the disc drives. The data in the unit of a block is called a data block. Generally, the operating system manages a certain number of sectors collectively as a block. An I/O request for some number of bytes from the user to a file is converted by the operating system to a request for the relevant I/O operation including the byte in question, to be executed subsequently. The host may address the data storage regions of the configured disc drives in units of blocks (or sectors). The data storage regions of the disc drives are divided into a plurality of physical blocks, the size of each physical block being commensurate with the size of the blocks handled by the host. Generally a physical block comprises a predetermined number of contiguous sectors in a disc drive. Logical block numbers are allocated to such physical blocks in advance by the disc drives.

The host designates a data storage location in a disc drive by specifying the logical block number of the block to be accessed. An array controller is provided to hold a queue for retaining read and write requests from the host. If any of the configured disc drives is available for accepting a request, a request is taken out of the queue and issued to that available disc drive. At this point, the host-designated logical block number is converted by the array controller into the drive number of the disc drive holding the physical block corresponding to that number as well as into the corresponding physical block number in the disc drive in question.

When writing data to a file or when expanding a file, the operating system allocates a new logical block to that file. The representative operating file described in "The Design and Implementation of the 4.3 BSD UNIX Operating System," Addison-Wesley Publishing Company, 1989, pp. 169–221 (called the cited reference 2 hereunder) allocates a plurality of logical blocks to a storage region when allocation of a data storage region becomes necessary, so that a total number of the logical block numbers is dependent upon a size of the data storage region.

In selecting a necessary logical block, the operating system uses information for designating unallocated logical blocks. This information is given in the form of a list or a bit map. Where a list of unallocated logical blocks is utilized, logical blocks to be allocated are selected sequentially starting from the top of the list. This list is prepared basically in order of logical block numbers when the disc drives are logically initialized. On the other hand, a bit map indicates by a flag whether any given logical block has already been allocated. The bit map allows unallocated logical blocks to be selected sequentially. Typically, the logical blocks to be allocated are selected as follows. A logical disc space is split into a plurality of logical block groups. A bit map is then provided for each of the logical block groups. During logical block selection, unrelated data (i.e., different directories and files) are allocated to logical blocks of different logical block groups and related data (the same directories and files) are allocated to logical blocks of the same logical block groups wherever possible.

Writes and reads to and from the logical blocks sequentially allocated as described are performed at high speed by specific techniques. One such technique is discussed in "Extent-like Performance from a UNIX File System," USENIX Winder '91, 1991, pp. 33–43 (called the cited reference 3 hereunder). The technique involves writing and reading data collectively to and from a series of logical blocks that are physically contiguous on the same disc drive.

Meanwhile, a number of techniques have been proposed to boost the speed at which to write and read data to and from the disc array. One such technique is discussed in an article "Disc Array Device with its Improved Performance Becomes Kernel of a Distributed System," Nikkei Electronics, No. 579, Apr. 26, 1993, pp. 92–103, Nikkei-BP Inc. (called the cited reference 4 hereunder). This technique involves having an array controller equipped with a cache memory. Also proposed in the same article is a technique for better performance whereby one physical disc array device is virtually split into a plurality of hard disc drives to which I/O requests are issued in parallel (p. 91 in the cited reference 4).

The RAID level 5 setup, as discussed above, involves significant overhead in writing data because a single data write request is serviced by executing a total of four reads or writes. A number of methods are being proposed for reducing the overhead.

For example, Japanese Laid-Open Patent Application No. Hei 4-264910 (called the cited reference 5 hereunder) discloses a technique applicable where a plurality of write data belonging to the same parity group are to be updated. The technique processes these writes collectively so that a minimum number of disc drives need to be accessed.

SUMMARY OF THE INVENTION

A major disadvantage of the RAID level 5 disc array is that it presents a limit to the number of disc drives that may operate in parallel because of conventional methods for allocating logical blocks. The problem of the restricted disc drive count that may be operated is explained below.

Among a plurality of file blocks to which ordinary application programs allocate logical blocks sequentially, there exist sequentially-ordered file blocks such as ones in the same file. Such file blocks are generally accessed sequentially. Thus these file block are sometimes called sequential file blocks.

As explained above, the typical operating system described in the cited reference 2 allocates unallocated logical blocks to related data blocks so that unallocated logical blocks having logical block numbers close to one another are allocated, through use of a list of unallocated logical blocks or a bit map representing these unallocated logical blocks. Therefore, where the list of unallocated logical block numbers is utilized, unallocated logical blocks come to be allocated to a plurality of sequentially-ordered file blocks in the order of their logical block numbers of the unallocated logical blocks. On the other hand, where the bit map of unallocated logical blocks is employed, unallocated logical blocks are allocated to such multiple file blocks in an order close to that of numbers of logical blocks. Ultimately, both methods cause unallocated logical blocks to be allocated to the sequentially-ordered file blocks in the order of logical block numbers of those unallocated logical blocks.

As shown in FIG. 40, the disc array generally has sequentially-ordered logical block numbers allocated to the physical blocks that hold data belonging to the same parity group. In a RAID level 5 disc array, different write requests may be executed in parallel if the disc drive to which to store the requested write data is different from the disc drive for holding the parity regarding the write data. In the disc array of FIG. 40 comprising five disc drives, up to two write requests may be executed in parallel. If, as discussed earlier, unallocated logical blocks are allocated to a plurality of sequentially-ordered file blocks in the order of the logical block numbers of the unallocated logical blocks, two physical blocks which belong to the same parity group and which have continuous logical block numbers are allocated to the two write requests issued in succession by the operating system. Therefore the write requests interfere with each other with respect to the disc drive holding the parity needed to execute the write requests; the requests cannot be executed in parallel. This lowers the speed at which write requests are carried out.

When logical blocks #L0 through #L3 are allocated to data blocks #T0 through #T3 having sequentially-ordered logical addresses on a program, the physical layout of the logical blocks is as shown in FIG. 41. Where the physical blocks with the logical block numbers #L0 through #L3 are allocated in this manner, these physical blocks belong to the same parity group and thus make it impossible to access simultaneously the disc drive #D4 holding the parity of that parity group. In the end, the data write requests are executed sequentially. That is, the number of requests executed in parallel is actually 1 (while two disc drives are operating in parallel).

The problem above also applies to read requests. A plurality of read requests are executed in parallel as long as the disc drives holding the requested data are different. This should mean that a maximum number of read requests that may be executed is equal to the maximum number of disc drives configured. However, suppose that logical blocks with sequentially different logical block numbers are allocated to a plurality of file blocks, and that read requests are made subsequently to read data from these file blocks. In that case, as shown in FIG. 40, the data in the first and the last physical block belong to the same disc drive and cannot be read simultaneously. Of the read requests issued, only those amounting to the number of configured disc drives minus 1 (representing the parity disc drive) are carried out in parallel.

The techniques discussed in the cited references 4 and 5 all involve having an array controller equipped with a cache memory for control over the execution of read and write instructions. This reduces the number of actual writes and reads to and from the disc drives, whereby the speed of these operations is enhanced. It follows that the conventional techniques cannot be used where write requests for directly writing target data to disc drives are to be issued independently to a plurality of data blocks. These techniques apply only to cases where a cache memory is provided or where read/write requests are issued so that a cache memory is effectively utilized. Furthermore, the conventional techniques are incapable of dealing with the situation of reads in FIG. 40.

The same problem occurs in a case discussed in the cited reference 4. The case involves a plurality of logical units being implemented by a single disc array, wherein logical blocks of sequentially different logical units are accessed.

All this suggests that it is desirable, in disc arrays such as the RAID level 5 disc array in which parity reads are required at the time of data writes, to devise appropriate ways to allocate storage regions within the disc array into which storage regions data to be written is actually written.

It is therefore an object of the present invention to provide a method for allocating storage regions in a disc array so as to boost the speed of executing write or read requests, the disc array being one of those such as the RAID level 5 disc array wherein parity reads are required at the time of data writes.

It is another object of the invention to provide a method for allocating storage regions in the disc array so that a maximum number of write requests may be executed in parallel.

It is a further object of the invention to provide a method for allocating storage regions in the disc array so that a maximum number of read requests may be executed in parallel.

It is an even further object of the invention to provide a method for allocating storage regions in the disc array so that a plurality of logical units may be implemented and that a maximum number of write requests may be executed in parallel.

It is a still further object of the invention to provide a method for allocating storage regions in the disc array so that write or read requests may be executed at higher speeds than ever before.

According to a first aspect of the present invention, unallocated storage regions in a disc array are allocated in succession to a plurality of sequentially-ordered data, in such a manner that a disc storage device to which a storage region allocated to each of the plurality of data and a storage region for holding an error correcting code for the each of the plurality of data, differ from disc drives to which storage regions which have been allocated to a predetermined number of data within the plurality of data, preceding to the each data and storage regions allocated to error correcting codes for those preceding data. That is, a storage region to be allocated to each of the plurality of data belongs to a third disc storage device different from a first and a second disc storage device, wherein the first disc storage device is one to which belongs a first storage region already allocated to one of a predetermined number of data preceding the each data , and the second disc storage device is one to which belongs a second storage region for holding error correcting code belonging to an error correcting data group retained in a storage region group to which the first storage region belongs. In addition a fourth disc storage device, different from the first and the second disc storage devices, is used to provide a storage region for holding an error correcting code belonging to an error correcting data group retained in a storage region group to which the storage region to be allocated belongs.

When the data are written sequentially into the disc array by use of the above allocation method, each of the plurality of data differs from its preceding predetermined number of data with respect to a data storage region and an error correcting code storage region. In this setup, writing of each of the plurality of data can be performed in parallel with writing of the predetermined number of data already in progress because the disc storage devices involved are different.

The allocation of storage regions is preferably executed by the operating system, The predetermined number may be 1 for a minimum. In this case, two consecutive data write requests are executed in parallel. The predetermined number is preferably less by 1 than a maximum integer which does not exceed the total number of the configured disc storage devices in the disc array, divided by the sum of 1 and the total number of disc storage devices each holding parity in each error correcting data group. In this case, a maximum number of write requests that may be executed in parallel by a plurality of disc storage devices constituting a logical group are actually executed in parallel.

According to a second aspect of the invention, unallocated storage regions in a disc array are allocated in succession to a plurality of sequentially-ordered data, in such a manner that a storage region to be allocated to each of a plurality of data belongs to a disc storage device different from disc storage devices to which data storage regions allocated to a predetermined number of data preceding to the each data, wherein the predetermined number is less by 1 than a total number of disc storage devices within the disc array.

The second aspect of the invention permits parallel execution of a maximum number of read requests that may be serviced by a plurality of disc storage devices constituting a logical group.

According to a third aspect of the invention, in a disc array realizing a plurality of logical units, a storage region which satisfies the condition as set forth in the first aspect of the invention is selected, in case storage regions belonging to sequentially different logical units are to be allocated to a plurality of data.

The third aspect of the invention permits parallel execution of at least two consecutive data write requests among a plurality of data writes to be performed successively to a plurality of logical units.

In a preferred structure according to the invention, the configured disc storage devices are each furnished with a new storage region in such a manner as to average as much as possible the number of write or read requests on request queues included throughout the devices.

Other objects and further features of the invention will be apparent from the following detailed description when read in conjunction with the accompanying drawings.

BRIEF DESCRIPTION OF THE DRAWINGS

FIG. 5 is a schematic view of unallocated logical block information;

FIG. 6 is an illustration of an allocation candidate logical block list;

FIG. 8 is an illustration of a logical/physical block number translation table;

FIG. 9 is a schematic view of disc array configuration information;

FIG. 10 is another schematic view of disc array configuration information;

FIG. 22 is an illustration of a logical block translation map;

FIG. 38 is a schematic view depicting a typical sequence in which to allocate logical blocks divided into logical units;

DESCRIPTION OF THE PREFERRED EMBODIMENTS

Figure 1:
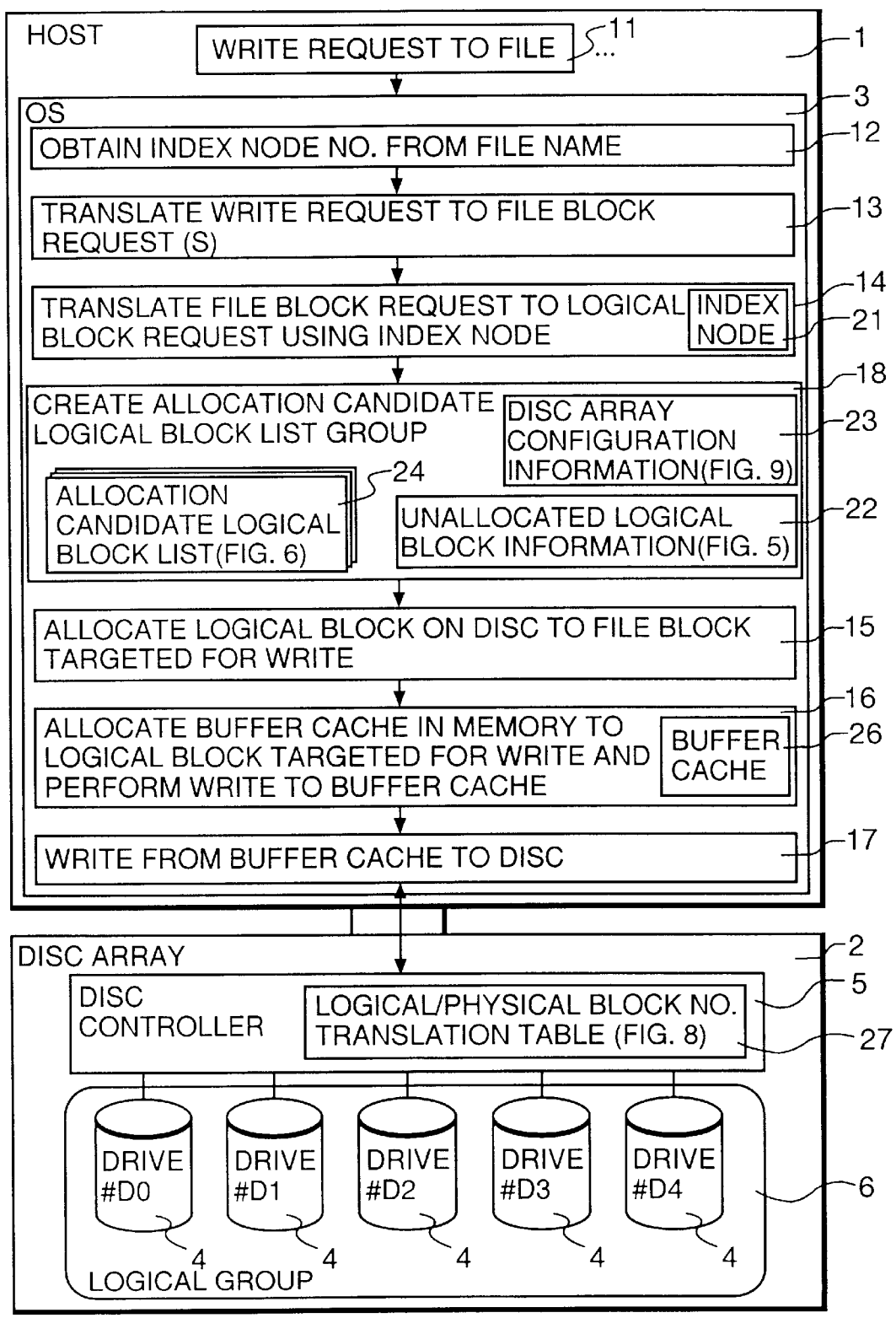
FIG. 1 is a schematic view showing the overall configuration of a first, a second, a fourth and a ninth embodiment of the invention.

Some preferred embodiments of the invention involving a disc array will now be described with reference to the accompanying drawings, wherein like reference numerals designate like or corresponding parts throughout.

FIRST EMBODIMENT

FIG. 1 is a schematic view showing the overall configuration of a computer system practiced as the first embodiment of the invention.

The computer system of FIG. 1 comprises a host 1 and a disc array 2 on the RAID level 5. The disc array 2 includes a disc controller 5 and a plurality of disc drives 4. Each of these disc drives 4 belong to a logical group. In FIG. 1, only the disc drives belonging to a logical group 6 are indicated. The logical groups 6, etc., are each a unit for recovery from failure. If any of the disc drives in a logical group fails, the data in the failed disc drive are recovered using the data in the other disc drives within the same logical group.

An operating system (OS) 3 works in the host 1. When an application program, not shown, issues a write request 11 to a file held in one of the disc drives, the operating system 3 controls the execution of the file write request. What the operating system 3 does for such control comprises: a process 12 for translating the file name designated by the write request into an index node managed by the operating system 3; a process 13 for translating the file write request into a file block write request; a process 14 for translating the file block determined by the process 13 into a logical block; a process 18 for creating an allocation candidate logical block list 24 used to allocate logical blocks to file blocks; a process 15 for actually allocating the logical block to the file block; a process 1 for allocating a buffer cache 26 to the write request; and a process 17 for issuing a write request to the disc drive. The allocation candidate logical block list 24 is created beforehand by use of disc array configuration information 23 in order to speed up the execution of the allocating process 15. The first embodiment uses as its operating system 3 the one described in the cited reference 2.

Figure 2:
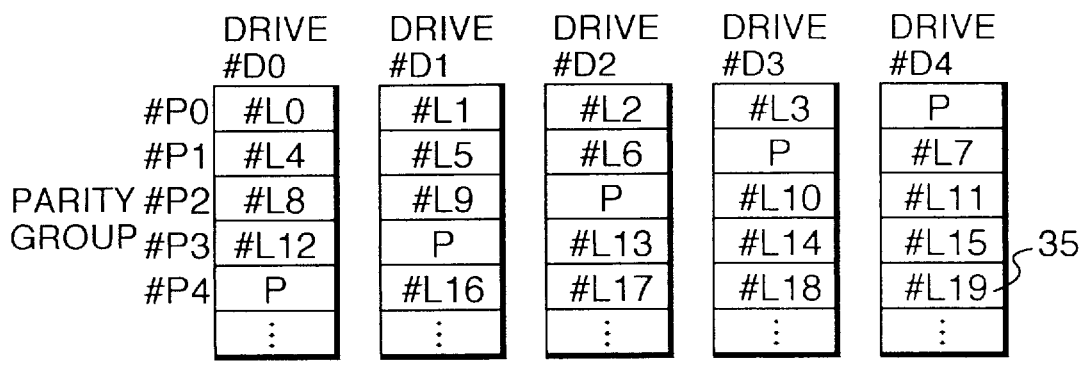
FIG. 2 is a schematic view of block locations.

The disc drives belonging to each logical group retain in a dispersed manner a plurality of data and parity data belonging to each of a plurality of parity groups. In the RAID level 5 disc array, as shown in FIG. 2, parity data belonging to different parity groups are held by sequentially different disc drives. The data storage regions of each disc drive are given logical block numbers #L0, #L1, etc., as depicted in FIG. 2, in the conventional order of disc drive numbers with the parity storage regions skipped.

The first embodiment is characterized in that, given a plurality of write requests for sequential writes to data blocks, the allocating process 15 allocates logical blocks so as to minimize the cases in which any of the disc drives holding the write data would coincide with the disc drive holding the parity of the parity group to which the data belong. This feature increases the number of write requests that may be executed in parallel. What follows is a detailed description of the processing by the first embodiment.

(Overall Flow of Processing)

When an application program, not shown, performs a write to a file, the program designates the file name, the write start location in the file, the pointer to a user buffer for the write data, and the size of the data.

The translating process 12 interprets the file name designated by the application program and finds the index node of the file. Generally the operating system 3 uses index nodes for associating file blocks with logical blocks. Index nodes comprise file management information and indices to logical blocks. These indices are used to associate logical blocks with file blocks in the order of file block numbers. That is, given an I/O request to a file from an application program, the operating system 3 interprets the file name to find the index node of the corresponding file. Using the index node, the operating system 3 translates the request into an operation on the relevant logical block. It is thus with improved efficiency that the index node allows disc space to be utilized and the logical blocks to be allocated for expansion of a file.

In the translating process 13, the operating system 3 translates the I/O request from the application program into a block count operation on the file in question. Fragments of the file in blocks are called file blocks that are numbered starting from the beginning of the file. Illustratively, a request such as "Write __ bytes of data starting from the __-th byte of the file" accepted by the operating system 3 is translated thereby into a request such as "Write __ bytes of data starting from the __-th byte of file block No. __" in a format (i.e., in blocks) suitable for use with disc drives.

In the translating process 14, the request for a file block is translated into a request for a logical block. Specifically, the index node obtained in the process 12 is used to find a logical block in a logical disc drive already allocated to the file block acquired in the process 13. The request for that file block is then translated into a request for the logical block thus determined.

It may happen that when the process 14 is to be executed, the request for the file block is found to be one for creating a new file or for expanding an existing file. In that case, a logical block has yet to be allocated to the file block in question. This requires that the logical block allocating process 15 select an appropriate unallocated logical block from unallocated logical block information 22 and allocate the logical block to the file block in question.

The buffer cache allocating process 16 associates a buffer cache 26 in memory with the logical block obtained by the process 14 or 15. Between the host 1 and the disc array 2, a write data block is transferred from the user buffer to the buffer cache 26 for buffering. Generally I/O requests between the disc array 2 and the host 1 are processed by way of the buffer cache 26 furnished in the memory of the host 1. The purpose of the buffer cache 26 is twofold: to buffer data transferred between the host and the disc drives, and to serve as a cache for logical blocks.

The data block placed in the buffer cache 26 is written by the disc write process 17 to the disc array 2 in an appropriate timing. A write to the disc array 2 is performed by issuing a write request for designating the number of the logical block.

In the disc array 2, the disc controller 5 receives from the host 1 the request for a write to the region designated by the logical block number. In turn, the disc controller 5 issues a write request to each disc drive 4. Using a plurality of disc drives 4, the disc array 2 logically emulates a conventional disc drive. That is, from the viewpoint of the host 1, a plurality of disc drives act apparently as a single conventional disc drive. In order to implement this feature, the disc controller 5 utilizes a logical/physical block number translation table 27 to translate the logical block number designated by the write request from the host 1 into a physical block number representing a physical block in a disc drive, the physical block number being a physical address in one of the disc drives making up the disc array 2. The write request supplied by the host 1 is then executed with respect to the physical block having the intra-drive physical block number thus obtained. The logical/physical block number translation table 27 is created to match each logical group. FIG. 8 is an illustration of a representative logical/physical block number translation table 27. The logical/physical block number translation table 27 comprises an intra-drive physical block number column 41 and a drive number column 42. Each of individual drive number-wise columns constituting the drive number column 42 holds logical blocks 43 corresponding to physical blocks in the disc drive having the drive number in question. The intra-drive physical block number column 41 indicates intra-drive physical drive numbers each being an address at which a data block or a parity block inside a disc drive is stored. When the host 1 designates a logical block number, the translation table 27 provides both the disc drive number corresponding to the region indicated by that logical block number, and the corresponding intra-drive physical block number.

With the first embodiment, as described, the process 18 creates the allocation candidate logical block list 24 from the unallocated logical block information 22 and disc array configuration information 23. The process 15 then allocates a given logical block to a given write request using the allocation candidate logical block list 24. The logical block to be allocated is selected so that nonconflicting disc drives will be provided for the two write requests to be executed in parallel. The description that follows will concentrate mainly on the processes 15 and 18.

(Process 18 for Creating Allocation Candidate Logical Block List)

The process 18 will now be described with reference to FIG. 12. The process 18 creates an allocation candidate logical block list 24 from the unallocated logical block information 22 and disc array configuration information 23. The list 24 is used by the logical block allocating process 15, to be described later, to select the necessary logical block from a minimum range of logical blocks to be searched. The allocation candidate logical block list 24 as a whole is created at system start-up time or at write request time. A new list 24 may be created as needed when the existing allocation candidate logical block list has been exhausted or when more write requests are being issued.

FIG. 9 shows the types of information contained in the disc array configuration information 23, and FIG. 10 depicts a specific example of the disc array configuration information 23. Referring to FIGS. 9 and 10, RAID level information 44 illustratively retains the value 5 representing the RAID level 5. A data drive count 45 holds the number of disc drives storing data (e.g., 4 representing four disc drives). A parity drive count 46 holds the number of disc drives storing parity data included in each parity group (e.g., 1 representing one disc drive). Parity drive location information 47 retains both the number of the disc drive that accommodates the first parity (e.g., 4 representing the disc drive #D4), and the difference in drive number from the number of the disc drive retaining the parity held in the adjacent parity group (e.g., −1). Drive level cache presence 48 holds the value 0 indicating the absence of a drive level cache.

FIG. 5 shows an example of the unallocated logical block information 22. This example represents unallocated logical block information in bit map format. Specifically, a flag of bit map information 31 is set to 0 when the corresponding logical block number 32 is already allocated, and a flag of bit map information 31 is set to 1 when the corresponding logical block number 32 is unallocated. In FIG. 5, each logical block number is given in eight bits because one block is managed in eight fragments. The reason for this is that although the file system is basically managed in blocks, the final portion of a file may need to be managed in fragments. The process 18 selects unallocated logical blocks from the unallocated logical block information 22 to create an allocation candidate logical block list.

Returning to FIG. 12, step 61 determines the number of logical blocks to be searched in deciding the logical block to be allocated next. With the first embodiment, the number of logical blocks is equal to the number of the disc drives configured in the disc array. The disc drive count is supplied by the disc array configuration information 23. The range of logical blocks to be searched may be expanded as needed.

Figure 13:
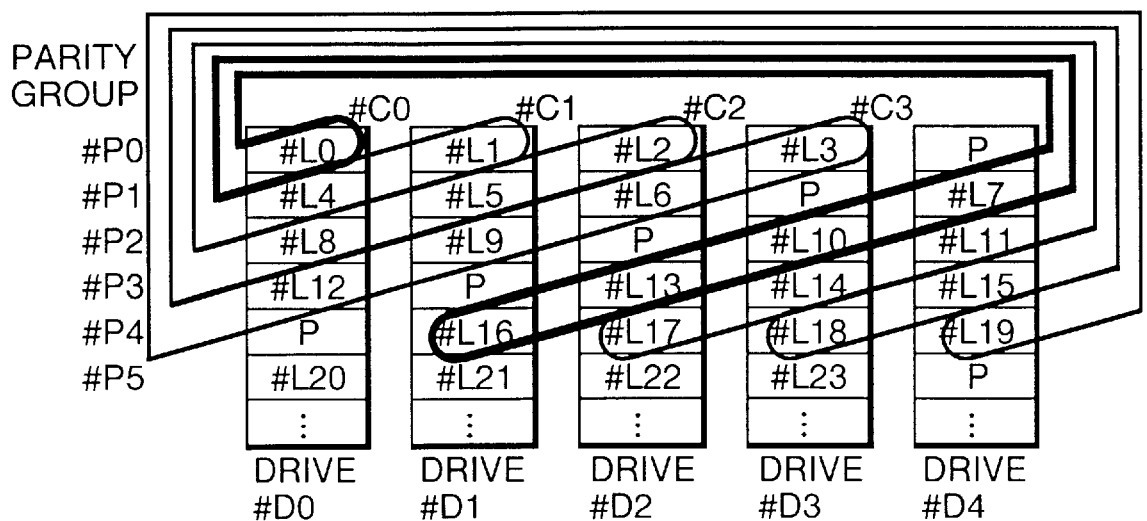
FIG. 13 is a schematic view showing allocation candidate logical block groups.

Step 61 is followed by step 62 that selects as many allocation candidate logical blocks as the number of logical blocks determined in step 61. With the first embodiment, step 62 selects a group of as many allocation candidate logical blocks as the configured disc drive count in the direction paralleling the parity holding disc drives on the RAID level 5, such as #C0 through #C3 in FIG. 13. The allocation candidate logical block group is selected by use of parity drive location information 47 supplied by the disc array configuration information 23. The allocation candidate logical block group is used to determine the range of logical blocks to be searched in creating an allocation candidate logical block list 24. If that range is determined by some other scheme, such a logical block group is not mandatory. However, if the logical block group is selected as shown in FIG. 13, the scheme has the advantage of simplifying the logical block allocating process 15. More about this aspect will be described later in connection with the allocating process.

In step 63, the allocation candidate logical block group thus created is placed in the allocation candidate logical block list 24. A plurality of such logical block lists are created in step 64. These lists are connected by pointers 33 each pointing to the next allocation candidate logical block list.

FIG. 6 shows an example of the allocation candidate logical block list 24 for a single logical block group. This allocation candidate logical block list comprises: a pointer 33 pointing to another allocation candidate logical block list; a pointer 34 pointing to the search start point in the allocation candidate logical block list; a pointer 35 pointing to the search end point in the allocation candidate logical block list; an allocation candidate logical block number 39; a pointer 38 pointing to the next logical block in the allocation candidate logical block list; and a pointer 40 indicating the end point of an unallocated logical block list. In the unallocated logical block list, a logical block already allocated has its pointer updated to point to the next unallocated logical block.

Figure 7:
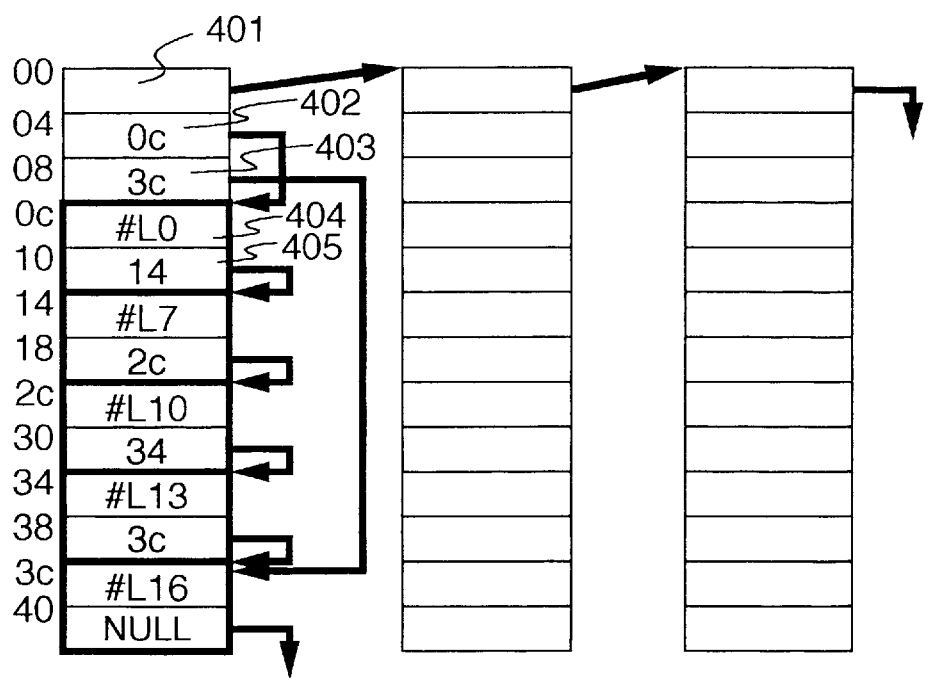
FIG. 7 is another illustration of an allocation candidate logical block list.

FIG. 7 depicts a specific example of information held in the allocation candidate logical block list 24. The pointer 33 to another allocation candidate logical block list retains a pointer 401 pointing to the next allocation candidate logical block list. The pointer 34 to the search start point in the allocation candidate logical block list holds the address 0c of the member from which to start searching through the allocation candidate logical block list. The pointer 35 to the search end point in the allocation candidate logical block list holds the address 3c of the last member to be searched in the allocation candidate logical block list. These pointers allow an arbitrary search start or end point to be selected within the allocation candidate logical block list. The allocation candidate logical block number 39 retains a block number #L0 representing an allocation candidate logical block 404. The pointer 38 to the next member in the allocation candidate logical block list contains an address 14 that serves as a pointer 405 to the next member. These pointers make it possible to skip any allocated member in the allocation candidate logical block list and to prepare a ring-like allocation candidate logical block list.

(Logical Block Allocating Process 15)

Figure 11:
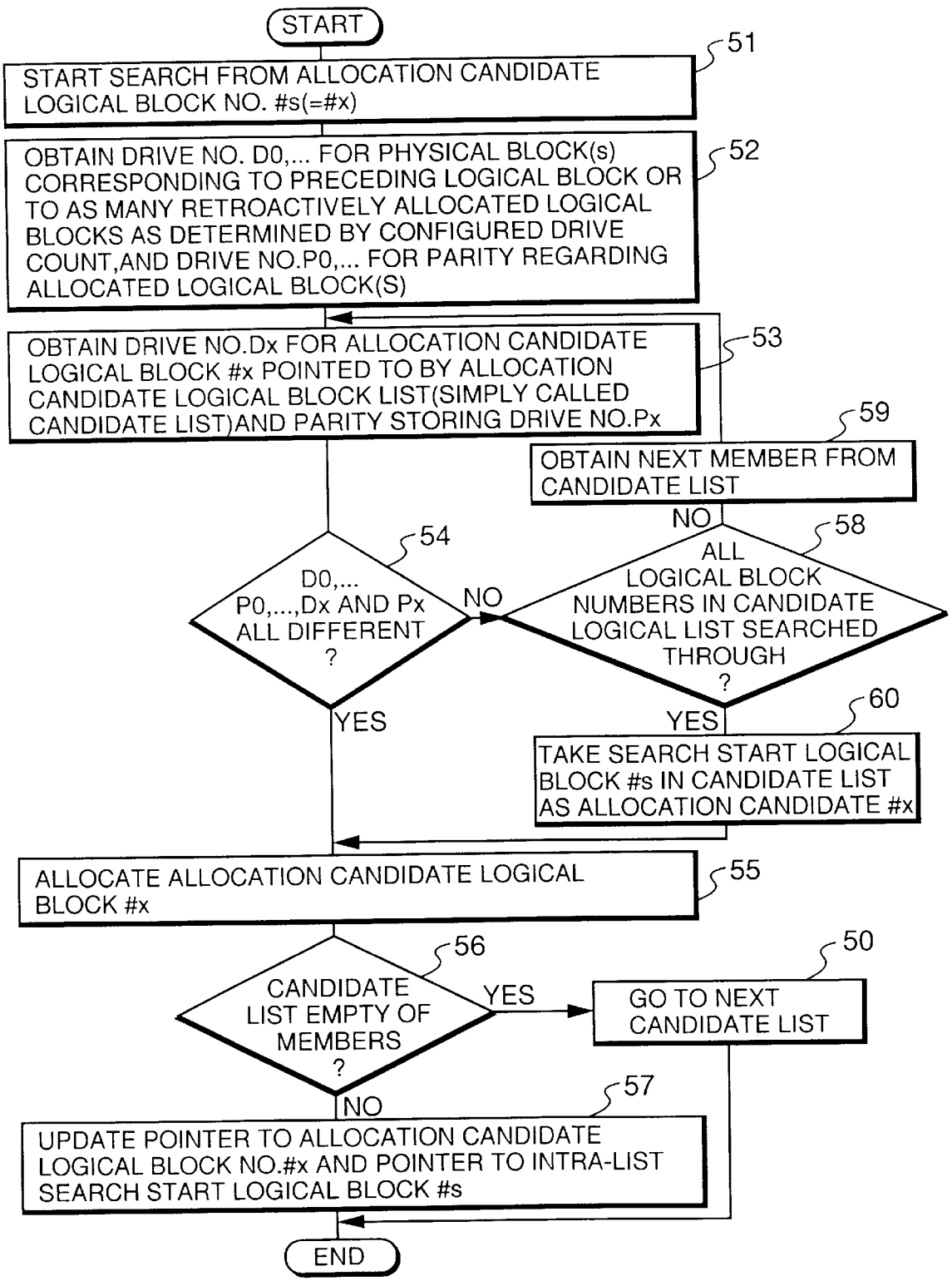
FIG. 11 is a flowchart of steps for logical block allocation processing.

FIG. 11 is a flowchart of typical steps constituting the process 15 for logical block allocation. When a logical block has yet to be allocated to a file block request in the translating process 14 of FIG. 1, the process 15 selects an unallocated logical block from the allocation candidate logical block list 24 and allocates the selected logical block to the file block in question. With the first embodiment, when logical blocks are to be selected for allocation to a plurality of logically continuous file blocks, the allocating process 15 selects the logical blocks to be allocated to the file blocks in such a manner that the data write disc drive needed by any two continuous file blocks will be different from the disc drive holding the parity data within the parity group to which the write data belong. The scheme makes it possible to write in parallel a maximum number of data blocks belonging to these logically continuous file blocks, the maximum number of data blocks being determined by the number of the disc drives configured in the disc array.

Step 51 in FIG. 11 acquires a member (#s) indicated by the pointer that points to the logical block from which to start searching in the allocation candidate logical block list. That member is taken as an allocation candidate logical block #x. Step 52 obtains both a drive number D0 for the preceding logical block allocated to a data block, and a drive number P0 for the parity corresponding to that logical block. Step 53 acquires both a drive number Dx for the allocation candidate logical block #x and a parity storing drive number Px. Step 54 checks through comparison to see if the drive numbers D0, P0, Dx and Px are all different from one another.

If the compare operation in step 54 shows that all drive numbers differ from one another, step 55 is reached. In step 55, the logical block #x is allocated as a logical block. In the unallocated logical block information, the logical block number corresponding to the allocated logical block is set as allocated. If any drive numbers coincide in step 54, step 58 is reached. In step 58, a check is made to see if all members in the allocation candidate logical block list have been searched through. If the search has yet to be finished, step 59 is reached. In step 59, the next allocation candidate logical block pointed to by the pointer 38 is taken as the allocation candidate logical block #x, and the process is continued. If the search is found to be completed in step 58, step 60 is reached. In step 60, the member from which the search was started in the allocation candidate logical block list is taken as the allocation candidate logical block #x. Step 60 is followed by step 55 in which the allocating process is carried out. After the logical block to be allocated next is determined in step 55, step 56 is reached. In step 56, a check is made to see if the allocation candidate logical block list is empty of members. If the allocation candidate logical block list is found to be empty of all members, step 50 is reached. Step 50 acquires the allocation candidate logical block list indicated by the pointer 33 that points to the next allocation candidate logical block list. If the allocation candidate logical block list is not empty of all members (in step 56), step 57 is reached. Step 57 updates both the pointer to the logical block #x and the pointer 33 to the logical block number from which to start a search through the allocation candidate logical block list.

In step 54, the compare operation may be performed not only with the preceding logical block allocated immediately before but also with more logical blocks allocated retroactively. The number of logical blocks to be compared retroactively may be determined on the basis of the number of the disc drives configured in the disc array. For example, the logical block to be allocated next is determined by comparing the data storing drives and parity storing drives corresponding to the logical blocks amounting retroactively to "the ideal number of parallel writes executed, minus 1."

For the RAID level 5 disc array, the ideal number of parallel writes executed with no cache effects considered is an integer not in excess of "the number of configured disc drives÷(the number of parity drives+1)." If it is desired to perform writes in an ideally parallel manner, it is therefore necessary to carry out another check in step 54. This check is made to see if the condition of nonconflicting drive numbers in step 54 is met by the data storing drives and parity storing drives corresponding to as many logical blocks allocated retroactively to data blocks as the integer determined in the manner described, starting from the data storing drive and parity storing drive corresponding to the preceding logical block allocated to any data block. For example, in a disc array having four data drives and one parity drive configured, the ideal number of parallel writes is 2. In this case, step 54 checks to see if its condition of uncoinciding drive numbers is met by the data storing drive and parity storing drive for the preceding logical block allocated immediately before.

Illustratively, suppose that in a disc array having five disc drives configured as shown in FIG. 2, logical blocks are to be allocated to logically continuous data blocks #T0, #T1, #T2, #T3, #T4, #T5, #T6, etc. In that case, the process of FIG. 11 will be carried out as follows: It is assumed that the condition of step 54 is met regarding the data block #T0 by the physical block having the first logical block number #L0 in the logical block group #C0 in FIG. 13 and that the physical block #L0 is allocated to this data block #T0. For the next data block #T1, the next logical block #L7 in the same logical block group is located in the disc drive #D4 holding the parity corresponding to the previously allocated logical block #L0. Thus the logical block #L7 fails to meet the condition of step 54. The condition is met by the next logical block #L10 in the group #C0. Thus the logical block #L10 is allocated to the data block #T1. For the next data block #T2, the next logical block #L13 in the group #C0 fails to meet the condition of step 54, but the next-but-one logical block #L16 meets the condition. Therefore the logical block #L16 is allocated to the data block #T2.

For the next data block #T3, the second logical block #L7 of the group #C0 is selected as an unallocated logical block within that group. A check is made to see if the logical block #L7 meets the condition of step 54. Because the logical block #L7 meets the condition, it is allocated to the data block #T3 (step 60). In like manner, the logical block #L13 is allocated to the next data block #T4.

Now that all logical blocks in the group #C0 have been allocated to the data blocks #T0 through #T4, the same process is repeated for the subsequent data blocks #T5 and on using the logical blocks in the next logical block group #C1.

Figure 3:
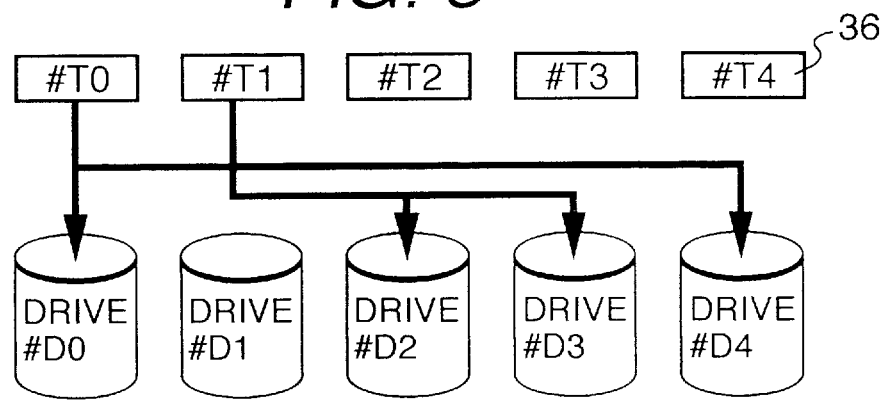
FIG. 3 is a schematic view depicting the effects of the first embodiment.
Figure 4:
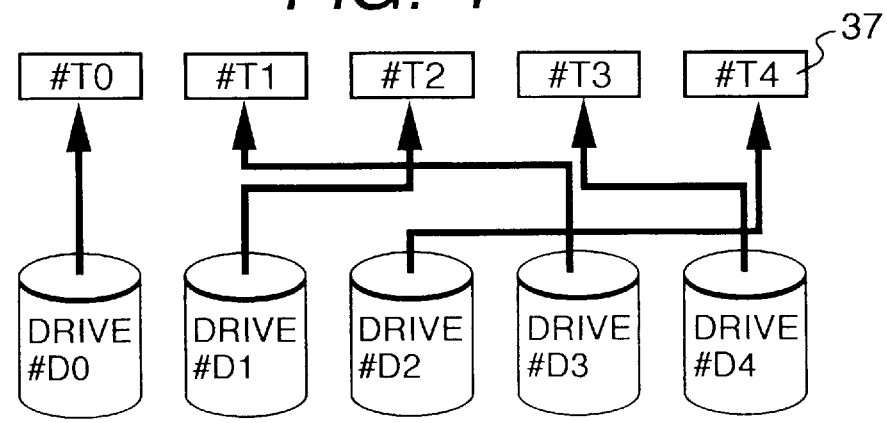
FIG. 4 is a schematic view sketching the effects of the second embodiment.

As a result of the above process, the logical block numbers #L0, #L10, #L16, #L7, #L13, #L4, #L11, etc., are allocated respectively to the data blocks #T0, #T1, #T2, #T3, #T4, #T5, #T6, etc. At this point, as shown in FIG. 3, the logical block #L0 in the disc drive #D1 and the parity in the disc drive #D4 are accessed for the write of the data block #T0; the logical block #L10 in the disc drive #D3 and the parity in the disc drive #D2 are accessed for the write of the data block #T1. This means that these two write requests do not contend for the drives they need. In other words, these data block write requests are executed in parallel on the logical blocks involved. Thus the number of write requests executed here in parallel is 2. Clearly, it is thus possible to execute as many write requests as the maximum number of write requests (i.e., 2) that may be executed in parallel by this disc array. In this case, four disc drives operate in parallel. It should be noted that the write of the next data block #T2 requires gaining access to both the disc drive #D1 containing the logical block #L16 and the disc drive #D0 holding the parity regarding the write data. The disc drive #D1 is available for writing the data block #T2 thereto, whereas the disc drive #D0 is not available for writing the data block #T2 while the drive is being used for the write of the preceding data block #T0.

The number of logical blocks to be checked in step 54 is generally dependent on the number of the disc drives configured in the disc array, as explained earlier. However, when the logical block group scheme of FIG. 13 is used, it has the advantage of increasing the possibility of selecting the logical block that meets the condition even though the comparison is made only with the preceding logical block allocated to any data block. It is also possible to narrow the range of candidate logical blocks to be compared.

Each of the logical block groups in FIG. 13 comprises logical blocks belonging to sequentially different disc drives. These logical blocks are located in parallel with the direction in which parity storing regions are provided variably. That is, within each logical block group, the disc drives storing the data blocks for the logical blocks are made different from the disc drives storing the corresponding parity. Under this scheme, the logical blocks belonging to any one of the logical block groups in FIG. 13 are selected in sequence within the group in step 51 or 59 of the logical block allocating process in FIG. 11. Clearly, the selecting process excludes the logical blocks not meeting the condition of step 54 from the blocks to be compared. In other words, even if the comparison is only with the preceding logical block allocated to any data block, it is possible to select the logical blocks for which at least the data block storing drives and the parity storing drives are different.

More specifically, the logical block currently selected to be allocated is likely to meet the condition of step 54 when compared with the logical blocks starting from the immediately previous logical block allocated to a data block and including the logical blocks allocated retroactively to as many data blocks as the ideal number of writes performed in the RAID level 5 disc array, i.e., an integer not in excess of "the number of configured disc drives÷(the number of parity drives+1)−1." Therefore the scheme of logical block groups in FIG. 13 offers the benefit of reducing the amount of the processing in step 54.

Referring further to FIG. 13, allocating logical blocks to data blocks provides the benefit of maximizing the number of read requests that may be executed in parallel on a plurality of sequential data blocks. The maximum read request count is limited by the number of the disc drives configured in the disc array. In this manner, the process 18 for creating allocation candidate logical block groups selects logical blocks in advance so as to simplify what takes place in step 54 of the logical block allocating process 15.

The ideal number of reads performed is generally equal to the number of the disc drives configured. In FIG. 13, each logical block group comprises logical blocks each belonging to a different disc drive. Since the logical block allocating process 15 allocates the logical blocks within each logical group to sequential data blocks on a one-to-one basis, the allocated logical blocks all belong to nonconflicting disc drives. This allows as many read requests as the total disc drive count to be executed on sequential data blocks.

VARIATIONS OF THE FIRST EMBODIMENT (1) In the logical block allocating process 15, the allocation candidate logical block list 24 is used to determine the range and sequence of the logical blocks to be searched. If the range and the sequence are otherwise determined, the allocation candidate logical block list 24 is not mandatory. Where the allocation candidate logical block list is not used, the comparison in step 54 for determining the logical block to be allocated next is illustratively modified. That is, the compare operation is performed not only with the preceding logical block allocated but also with the logical blocks retroactively allocated.

(2) Alternatively, the condition of the ideal number of parallel writes/reads may be added when the allocation candidate logical block list of FIG. 6 is created, and the logical blocks may be placed in the list in a sequence meeting that condition. This eliminates the steps of the logical block allocating process 15 and allows the logical blocks to be allocated in accordance with the candidate list.

Figure 12:
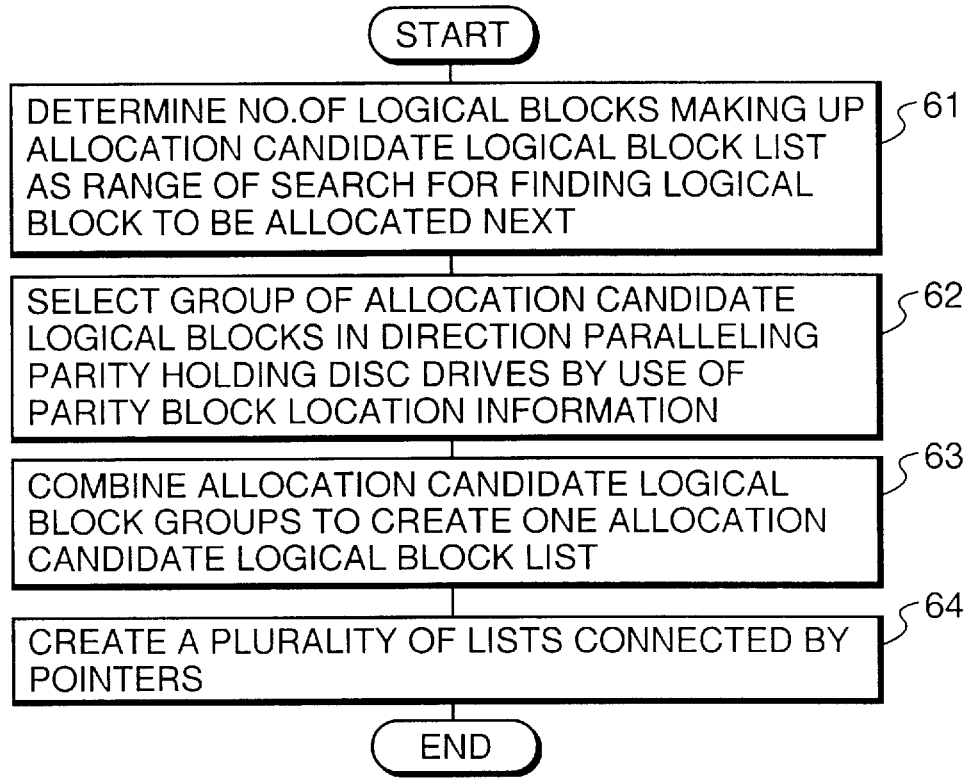
FIG. 12 is a flowchart of steps for creating an allocation candidate logical block list group.

Specifically, step 63 in the processing of FIG. 12 is supplemented by a compare operation corresponding to step 54 in FIG. 11. This variation is equivalent to the third embodiment, to be described later, in terms of allocating logical blocks according to a given list. The variation differs from the third embodiment in two aspects: the manner of managing unallocated logical blocks, and the preparation of the list (a logical block allocation sequence list for the third embodiment) triggered by a write request.

SECOND EMBODIMENT

The first embodiment allocates logical blocks so that a number of write requests on sequential data blocks may be executed in parallel to a maximum extent. By contrast, the second embodiment allocates logical blocks so that a number of read requests on sequential data blocks may be executed in parallel to a maximum extent.

The maximum number of read requests that may be carried out in parallel is equal to the total number of the disc drives configured within a logical group. Thus sequentially different disc drives need only be allocated to a plurality of sequential data blocks. This simply requires that in the process 15 of FIG. 1, the comparison of step 54 in FIG. 11 be limited to data storing drives only. The parity storing drives need not be compared. More specifically, the logical blocks belonging to each of the allocation candidate logical block groups in FIG. 13 are allocated consecutively to sequential data blocks.

THIRD EMBODIMENT

The operating system of the first embodiment determines the logical block to be allocated only when there occurs a need to allocate a logical block. By contrast, an alternative operating system may determine in advance the sequence in which to allocate logical blocks and later allocate logical blocks according to that sequence when it is necessary to do so. The third embodiment works with this type of operating system.

In creating the list, the third embodiment determines beforehand the sequence in which to allocate unallocated logical blocks to a plurality of sequential file blocks. The sequence of unallocated logical blocks is determined so that a maximum number of data write requests regarding these file blocks may be executed in parallel, the maximum number being determined by the disc array.

Figure 14:
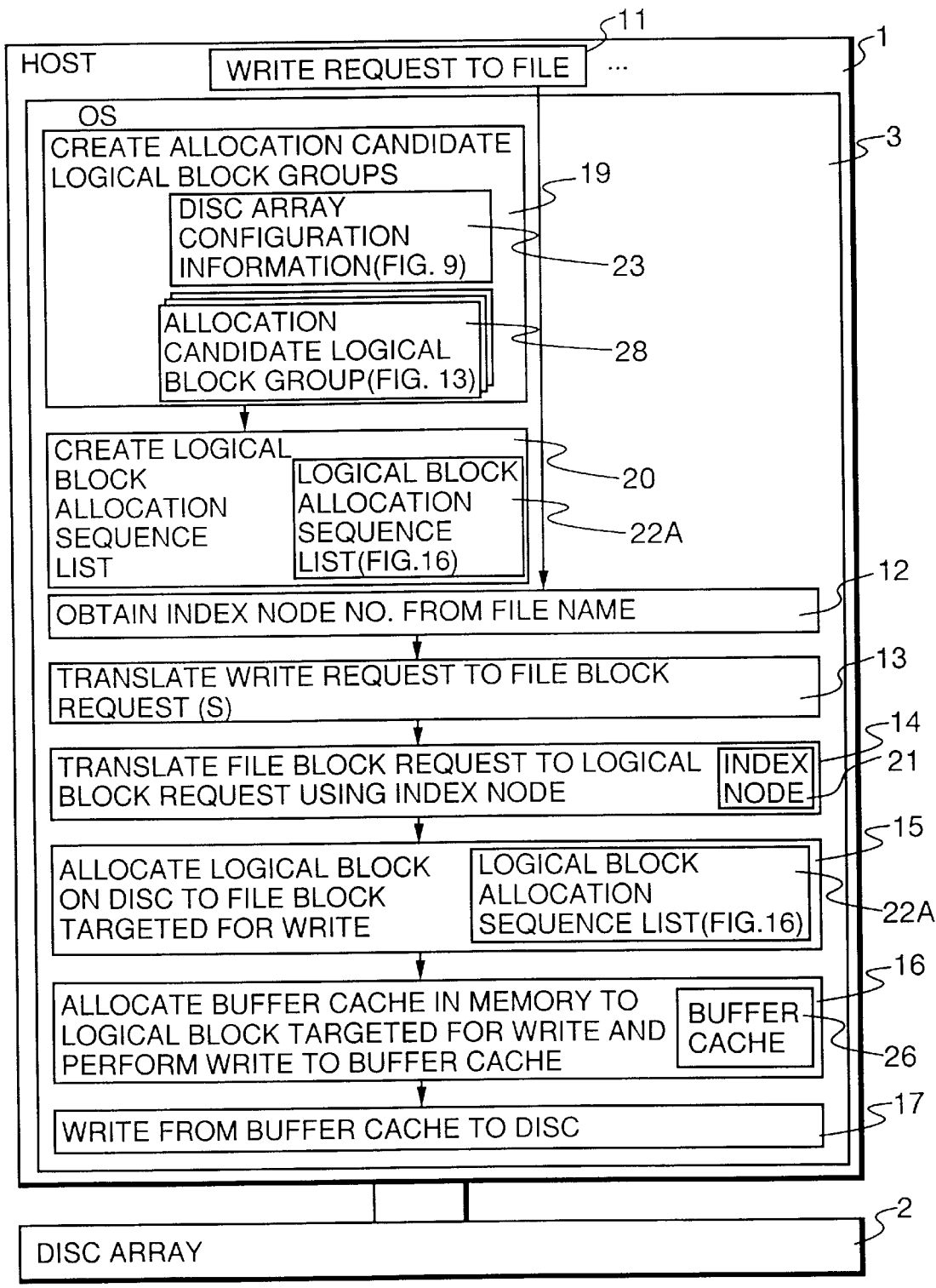
FIG. 14 is a schematic view illustrating the overall configuration of a third embodiment of the invention.

FIG. 14 is a schematic view showing how the third embodiment carries out data writes to the disc array 2. The third embodiment, as with the first, determines an allocation candidate logical block group 28 (FIG. 13) using the disc array configuration information 23 in the process 19 (step 62 in FIG. 12). Unlike the first embodiment, the third embodiment then references the allocation candidate logical block group 28 to create a logical block allocation sequence list 22A (FIG. 17) in the next process 20. Also differing from the first embodiment, the third embodiment allocates logical blocks to file blocks in the sequence of the list 22A in a logical block allocating process 15A, to be described later.

How the logical block allocation sequence list 22A is created will now be described in more detail with reference to FIG. 15. What characterizes this process is that it performs the same check as the compare check in step 54 (FIG. 11) carried out in the logical block allocating process 15 of the first embodiment.

Figure 15:
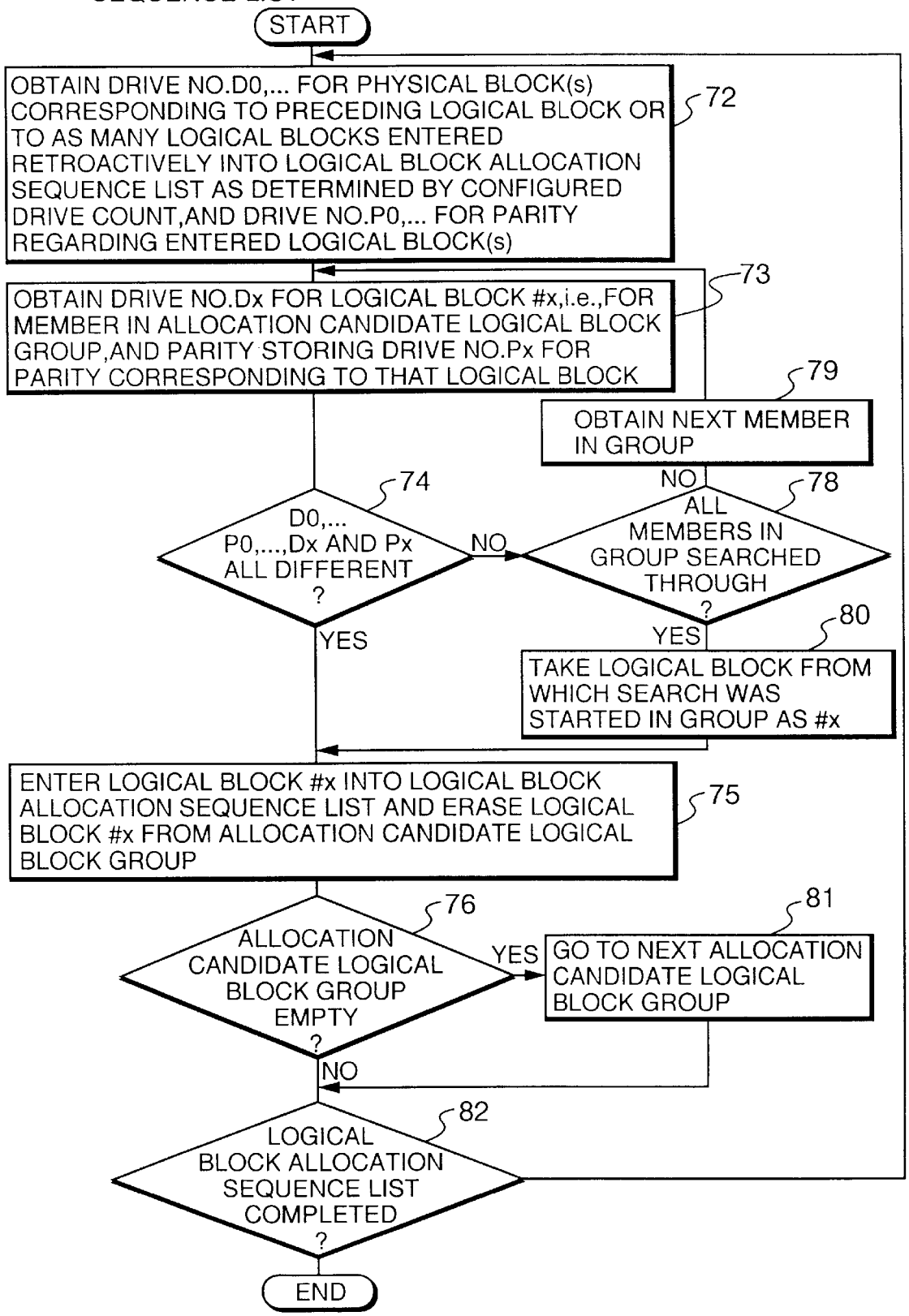
FIG. 15 is a flowchart of steps for creating a logical block allocation sequence list.

Step 72 in FIG. 15 acquires both a drive number D0 for the preceding logical block entered into the logical block allocation sequence list and a parity storing drive number P0 for the parity corresponding to that logical block. Step 73 obtains both a drive number Dx for a logical block #x, i.e., a member in a given allocation candidate logical block group, and a parity storing drive number Px for the parity corresponding to that logical block. Step 74 checks to see if the drive numbers D0, P0, Dx and Px are different from one another. If these drive numbers are found to be all different from one another, step 75 is reached. In step 75, the logical block #x is taken as the logical block to be entered next into the logical block allocation sequence list. If any drive numbers coincide in step 74, step 78 is reached. In step 78, a check is made to see if all members in the allocation candidate logical block group have been searched through. If the search has yet to be finished, step 79 is reached. In step 79, the next logical block, i.e., the next member in the group is taken as the logical block #x, and the process is continued. If the search is found to be completed in step 78, step 80 is reached. In step 80, the member from which the search was started in the allocation candidate logical block group is taken as the logical block #x which is then entered into the logical block allocation sequence list (step 75). Step 75 is followed by step 76 in which a check is made to see if the allocation candidate logical block group is empty of members. If the allocation candidate logical block group is found to be empty of all members, step 81 is reached. In step 81, the next allocation candidate logical block group is acquired.

Figure 16:
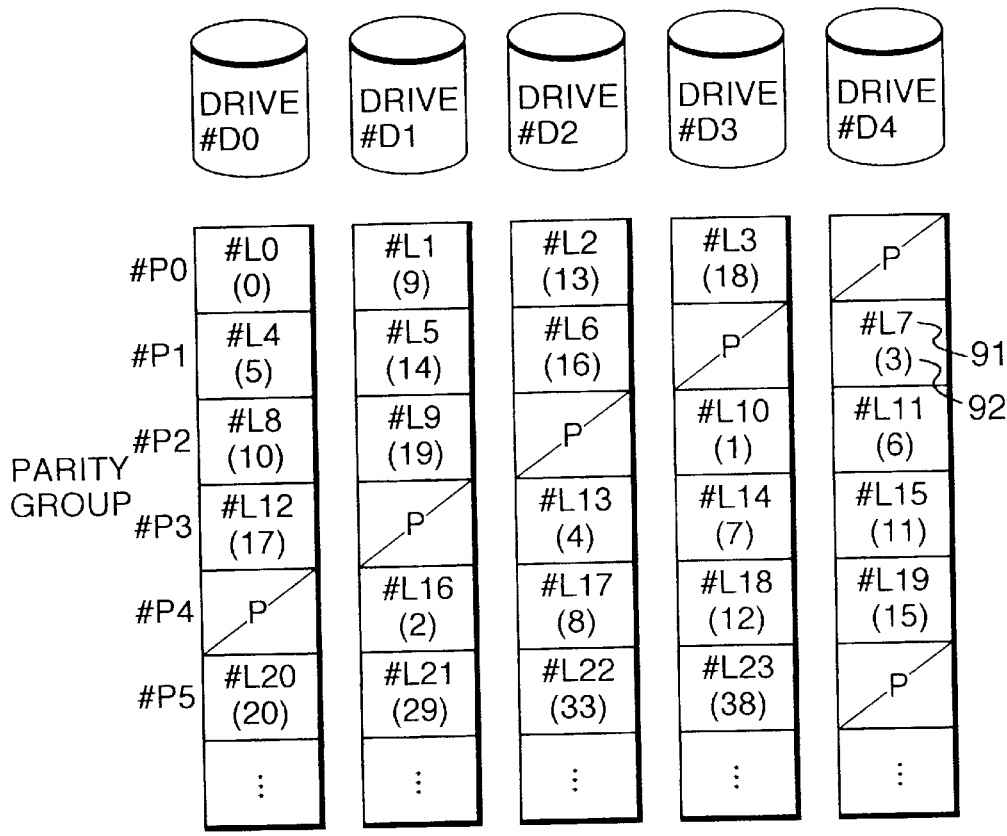
FIG. 16 is a schematic view depicting how logical blocks are allocated.
Figure 17:
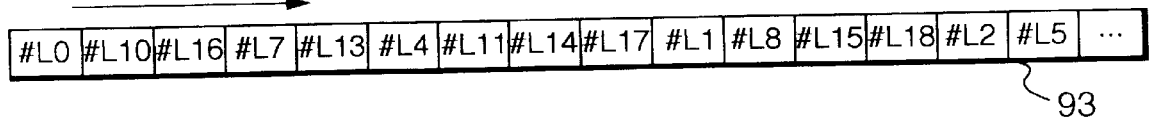
FIG. 17 is a schematic view of a logical block allocation sequence list.

FIG. 17 shows an exemplary logical block allocation sequence list 22A actually created on the basis of the allocation candidate logical block groups in FIG. 13. FIG. 16 indicates a logical block allocation sequence 92 determined by the sequence list 22A. Each of the blocks in FIG. 16 has a number showing where the block stands in the sequence. The sequence obtained here coincides with that in which logical blocks are allocated to the data blocks #T0, #T1, etc., by the first embodiment.

In this example, the logical block allocating process 15 (FIG. 1) allocates logical blocks using this logical block allocation sequence list 22A; the allocation candidate list 24 (FIG. 1) is not utilized. The logical block allocation sequence list 22A is created when a file system is prepared. In this example, the logical blocks in the logical block allocation sequence list are allocated from the first block on in response to logical block allocation requests being consecutively issued. Specifically, when the first logical block allocation request is issued, the logical block #L0 is allocated and is erased from the allocation list. With the next allocation request issued, the logical block #L10 is allocated and is erased from the allocation list, and so on. Whenever any logical block is allocated to a file data block, that logical block is erased from the list 22A. Later, when the logical block in question is released illustratively because the corresponding file has been erased, that logical block is entered again into the logical block allocation sequence list 22A. After repeated allocation and release of logical blocks over time, the allocation sequence can deviate from the rules set forth above. This snag may be averted by updating the logical block allocation sequence list upon elapse of a predetermined time or when a predetermined number of unallocated logical blocks is reached.

As described, the third embodiment, as with the first, takes the disc array configuration into account and thereby executes a plurality of write requests in parallel with respect to a plurality of sequential file blocks to which logical blocks are allocated. Although the third embodiment is simpler in processing procedures than the first embodiment, the third embodiment has the disadvantage of having to update the prepared logical block allocation sequence list in applications where the allocated logical blocks are frequently released.

VARIATION OF THE THIRD EMBODIMENT (1) The allocation candidate logical block groups in FIG. 13 are used by the process 20 (for creating a logical block allocation sequence list) in defining the range of logical blocks to be searched and in improving the efficiency of what takes place in step 74. If these aspects of the process are accomplished by some other scheme, the allocation candidate logical block groups are not mandatory. Where no allocation candidate logical block groups are used, the comparison in step 74 for determining the logical block to be allocated next is illustratively modified. That is, the compare operation is performed not only with the preceding logical block allocated but also with more logical blocks retroactively allocated. As with the first embodiment, the number of the logical blocks compared retroactively in step 74 may be determined on the basis of the number of the disc drives configured in the disc array. Specifically, the logical block to be allocated next is determined by comparing the data storing drives and parity storing drives corresponding to the logical blocks amounting retroactively to "the ideal number of parallel writes executed, minus 1."

FOURTH EMBODIMENT

The process of the third embodiment for creating the logical block allocation sequence list 22A may be used to create a logical block allocation translation map 29 shown in FIG. 22. Specifically, after the third embodiment creates the logical block allocation sequence list 22A, the map 29 is created on the basis of that list 22A. The map 29 is made by associating the allocation sequence 92 depicted in FIG. 16 with logical block numbers 93 shown in FIG. 17. The map 29 is used to take logical block numbers 241 allocated in a logically consecutive manner by the logical block allocating process 15 and translate (i.e., reallocate) these logical block numbers 241 into the relevant reallocated sequence 242, whereby the physical blocks indicated by the logical block numbers are translated in location.

Unlike the first, the second or the third embodiment, the fourth embodiment has its logical block allocating process implemented using two parts: a logical block allocating part and a logical block translating part. The logical block allocating part allocates logical blocks temporarily to file blocks in a conventional manner without being aware of the drive configuration of the disc array. The logical block translating (i.e., reallocating) part then translates the temporarily allocated logical blocks using the logical block translation map 29.

In the example of FIG. 22, there are 20 combinations of logical block numbers 241 (#Li0–#Li19), allocated by the operating system (process 15 of FIG. 1), with reallocated logical block numbers 242 for mechanically executed translation. For example, suppose that x represents the logical block number allocated by the operating system. Dividing x by 20 gives a remainder (x%20) that is translated by the logical block translation map into a reallocated logical block number y. Calculating $$y+x-(x\%20)$$

provides the translation of all combinational patterns. That is, in the above example, the 20-entry translation map is sufficient to implement logical block number translation. A translation map covering all logical block numbers is thus not mandatory.

VARIATION OF THE FOURTH EMBODIMENT (1) The static translation map used by the fourth embodiment may be replaced by a dynamic translation map that is created dynamically by the process of FIG. 1 for each logical block allocation. In this case, logical blocks are not allocated in step 55 of FIG. 11 but are instead entered into the translation map. The process involved is the same as one in the fifth embodiment, to be described later with reference to FIG. 21.

This variation, like the first or the second embodiment, increases the number of reads/writes performed in parallel, while leaving intact the conventional logical block allocating process performed by the operating system.

FIFTH EMBODIMENT

Figure 18:
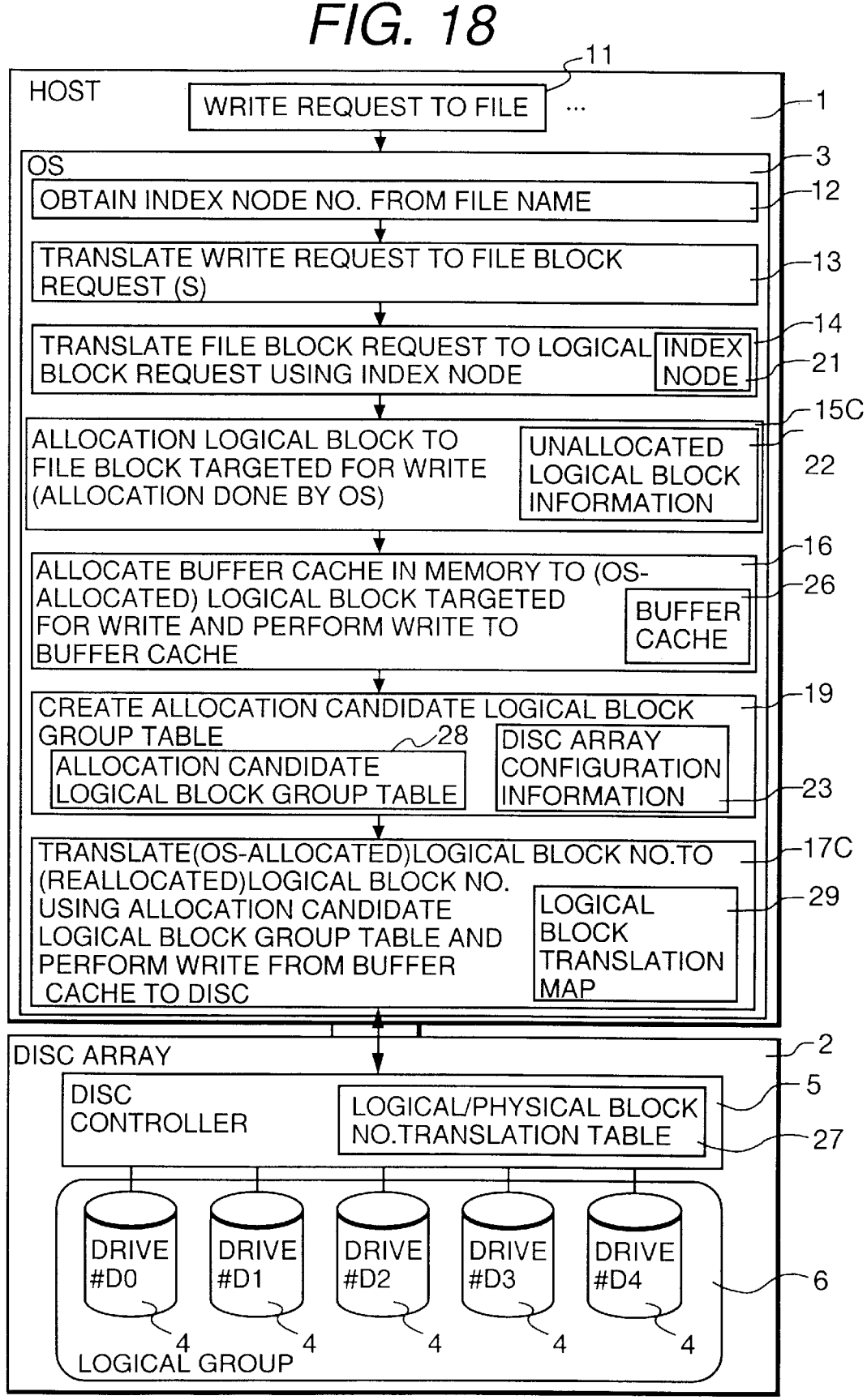
FIG. 18 is a schematic view illustrating the overall configuration of a fifth and a tenth embodiment of the invention.

FIG. 18 sketches the overall configuration of the fifth embodiment of the invention. In the fourth embodiment and its variation, the process 15 for logical block allocation is implemented through use of the logical block allocating part and logical block translating part. By contrast, what characterizes the fifth embodiment is that its logical block translating part is included in the process 17 for writes to disc drives.

Unlike the first, the second, the third or the fourth embodiment, the fifth embodiment has its logical block allocating process 15C conventionally allocate logical blocks (by the operating system) in response to a plurality of sequential file block write requests without regard to the disc array configuration. In a disc write process 17C, the data blocks of these file blocks are written to a buffer cache managed by the operating system. Before the transfer of write requests regarding these data blocks to the disc array, the allocated logical blocks are translated (i.e., reallocated) with the disc array configuration taken into account.

The fifth embodiment is superior to the first through the fourth embodiment in that there is no need for the logical block allocating process 15C to become aware of the physical constitution of the disc array as I/O devices. The process 15C need not be modified in practicing the invention. That is, the process 15C situated above file I/O processing by the operating system need only act in the same manner regardless of the device type. Only the process 17C, which is generally furnished depending on the device type, needs to have a conventional software structure that requires being aware of the physical configuration of the disc array.

In FIG. 18, the logical block allocating process 15C selects an appropriate unallocated logical block from the unallocated logical block information 22 in response to a write request that requires allocating a new logical block to a file block, so that the unallocated logical block is allocated anew to the file block. The process 16 then writes a data block to the buffer cache. Thereafter, the process 17C translates the location of the logical block in question using the disc array configuration information 23, logical block translation map 29 and allocation candidate logical block group table 28. At this point, the logical block number before location translation is regarded as an operating system-allocated logical block number and the logical block number after translation is regarded as a reallocated logical block number. The operating system-allocated logical block number is a logical block number associated with a file block number by the process 14 using an index node, and the reallocated logical block number is a logical block number associated directly with the physical block location in a disc drive of the disc array 2.

The allocation candidate logical block group table 28 for use in the allocating process is generated in advance by the process 19.

Figures 19, 20:
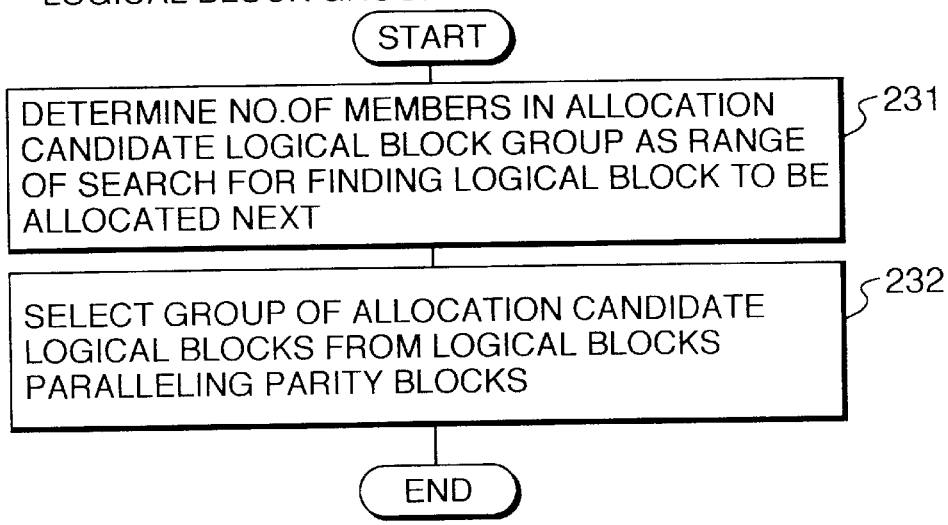
FIG. 19 is a flowchart of steps for creating an allocation candidate logical block group table.
FIG. 20 is an illustration of an allocation candidate logical block group table.

FIG. 20 illustrates an exemplary allocation candidate logical block group table 28. The allocation candidate logical block group table 28 comprises operating system-allocated logical block numbers 234, allocation candidate logical block group numbers 235, and reallocated logical block numbers 236. When an operating system-allocated logical block number is given, the table 28 indicates the allocation candidate logical block group and reallocated logical block number to which the given logical block number belongs. The process 19 for creating the allocation candidate logical block group table 28 will now be described in more detail with reference to FIG. 19. Step 231 in FIG. 19 determines the number of members in the allocation candidate logical block group, thus defining the range of search for deciding the location of a given operating system-allocated logical block. Although the fifth embodiment considers the number of members to be the same as the number of the disc drives configured in the disc array, the member count may be increased to expand the range of search. Step 231 is followed by step 232 that determines as many allocation candidate logical blocks as the number of members defined in step 231.

With the fifth embodiment, a group of allocation candidate logical blocks is selected in the direction paralleling the parity storing drives of the RAID level 5, such as allocation candidate logical blocks #C0 through #C3 shown in FIG. 13. Needless to say, any other appropriate method may be used to select the allocation candidate logical block group.

One function of the allocation candidate logical block table is to prevent the allocation of the region of a reallocated logical block number to a location too physically far away in the disc array from the data block to which is allocated the logical block number that in turn is allocated by the operating system in the process 15C. In the example of FIG. 20, when #Li0 is given as the operating system-allocated logical block number, the reallocated logical block numbers are limited to #Ld0, #Ld7, #Ld10, #Ld13 and #Ld16. Some other appropriate method may also be used to prevent the allocation of the region of a reallocated logical block number to a local too physically far away from the data block in question.

For a group of allocation candidate logical blocks several of which are already allocated, the members of the group are determined in one of two ways: by giving priority to the parity group boundary, or by keeping the number of members consistent between groups. More specifically, suppose that #L1 is already allocated in the allocation candidate logical block group #C0. In that case, the members of the group #C0 are #L7, #L10, #L13 and #L16 if priority is given to the parity group boundary; the members are #L7, #L10, #L13, #L16 and #L20 if emphasis is on the member count consistency.

FIG. 22 shows an exemplary logical block translation map. The logical block translation map associates operating system-allocated logical block numbers 241 with reallocated logical block numbers 242. The fifth embodiment creates this logical block translation map dynamically so as to vary the associations depending on the processing status of the disc array. What characterizes the dynamic map is that although more steps are involved, the allocating process can be optimized because mapping is carried out for each request.

Figure 21:
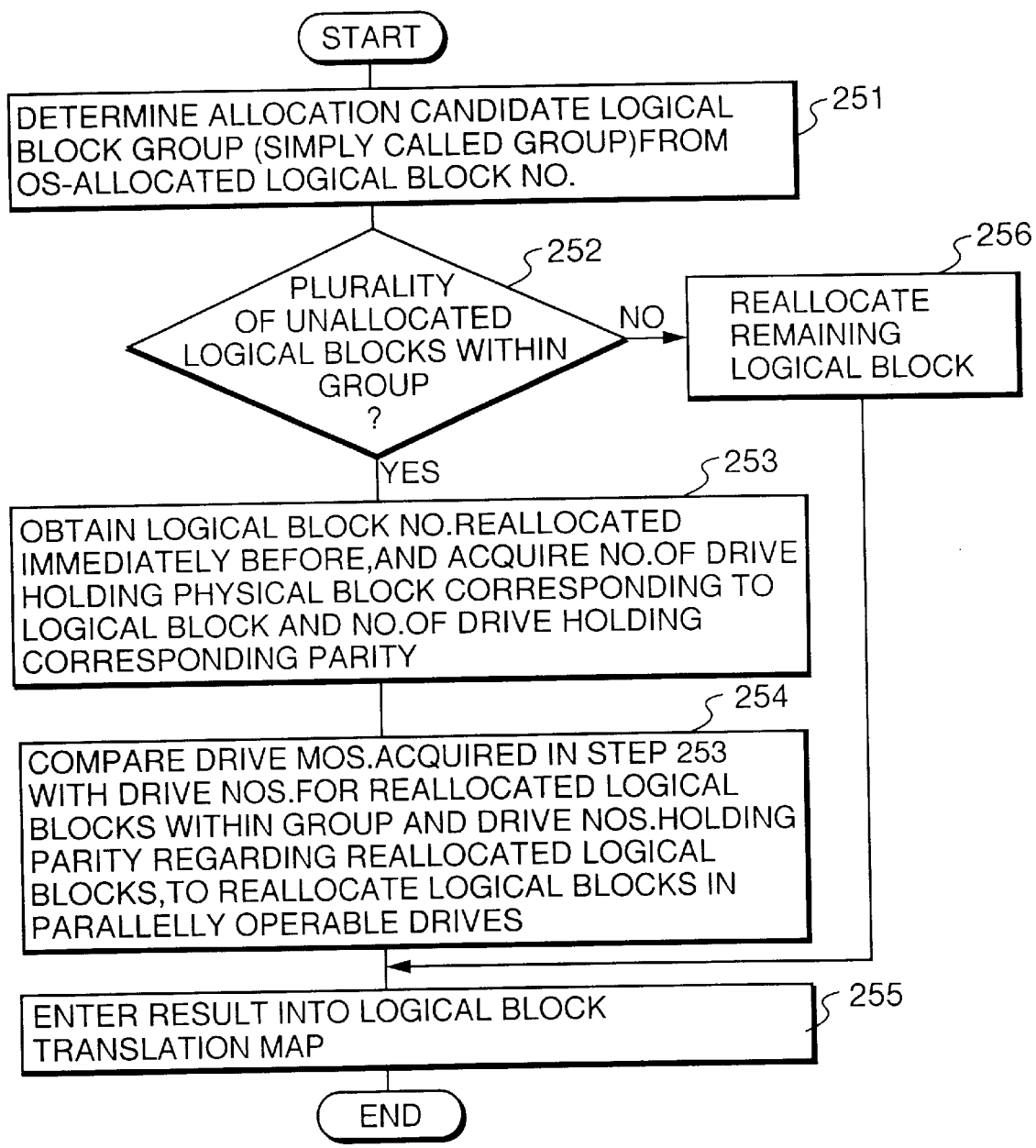
FIG. 21 is a flowchart of steps for region allocation processing.

How the logical block translation map is created will now be described in more detail with reference to FIG. 21. The location of a given operating system-allocated logical block is selected and determined from the reallocated logical blocks within the allocation candidate logical block group to which that operating system-allocated logical block belongs. The selecting and determining steps are as follows:

In FIG. 21, given an operating system-allocated logical block number, step 251 acquires both the number of the allocation candidate logical block group to which the operating system-allocated logical block belongs and the number of the corresponding reallocated logical block. Step 252 references the logical block translation map to see if there exist a plurality of logical block numbers yet to be reallocated within the allocation candidate logical block group in question. If there is only one logical block number to be reallocated, that logical block is associated unconditionally with the operating system-allocated logical block (step 256). If there are a plurality of logical block numbers yet to be reallocated, step 253 is reached. Using the preceding reallocated logical block number associated immediately before, step 253 acquires both the data storing disc drive number and parity storing disc drive number for the corresponding physical block. Step 254 compares the drive numbers thus acquired with the drive numbers for the reallocated logical blocks within the allocation candidate logical block group in question and the corresponding parity drive numbers, whereby the operating system-allocated logical block is associated with a reallocated logical block. At this point, the reallocated logical block numbers with nonconflicting disc drive numbers are selected as in steps 53 and 54 and 58 through 60 in FIG. 11. If none of the numbers meets the condition, an appropriate unallocated logical block number is selected from the allocation candidate logical block group. In step 255, the result of the associating process is entered into the logical block translation map.

In the manner described, logical block numbers are reallocated dynamically to the logical blocks allocated by the operating system in the process 15C. This averages as much as possible the write requests involving logical block allocation with respect to disc drives.

VARIATION OF THE FIFTH EMBODIMENT (1) In a variation of the fifth embodiment, the logical block translation map may be prepared statically in advance. The static preparation of the map is done beforehand by the same process as that in the third embodiment of preparing the logical block allocation sequence list 22A and of creating the logical block translation map on the basis of that list 22A. This map associates the allocation sequence 92 shown in FIG. 16 with the logical block numbers 93 given in FIG. 17.

In the example of FIG. 22, there are 20 combinations of operating system-allocated logical block numbers 241 (#Li0–#Li19) with reallocated logical block numbers 242. The combinations are conducive to mechanical translation, as described in connection with the third embodiment.

SIXTH EMBODIMENT

The sixth embodiment, like the fifth, controls the allocation of logical blocks so as to average as much as possible the write requests involving logical block allocation with respect to disc drives. Unlike the fifth embodiment, however, the sixth embodiment uses a disc controller for controlling the allocation of logical blocks.

Figure 23:
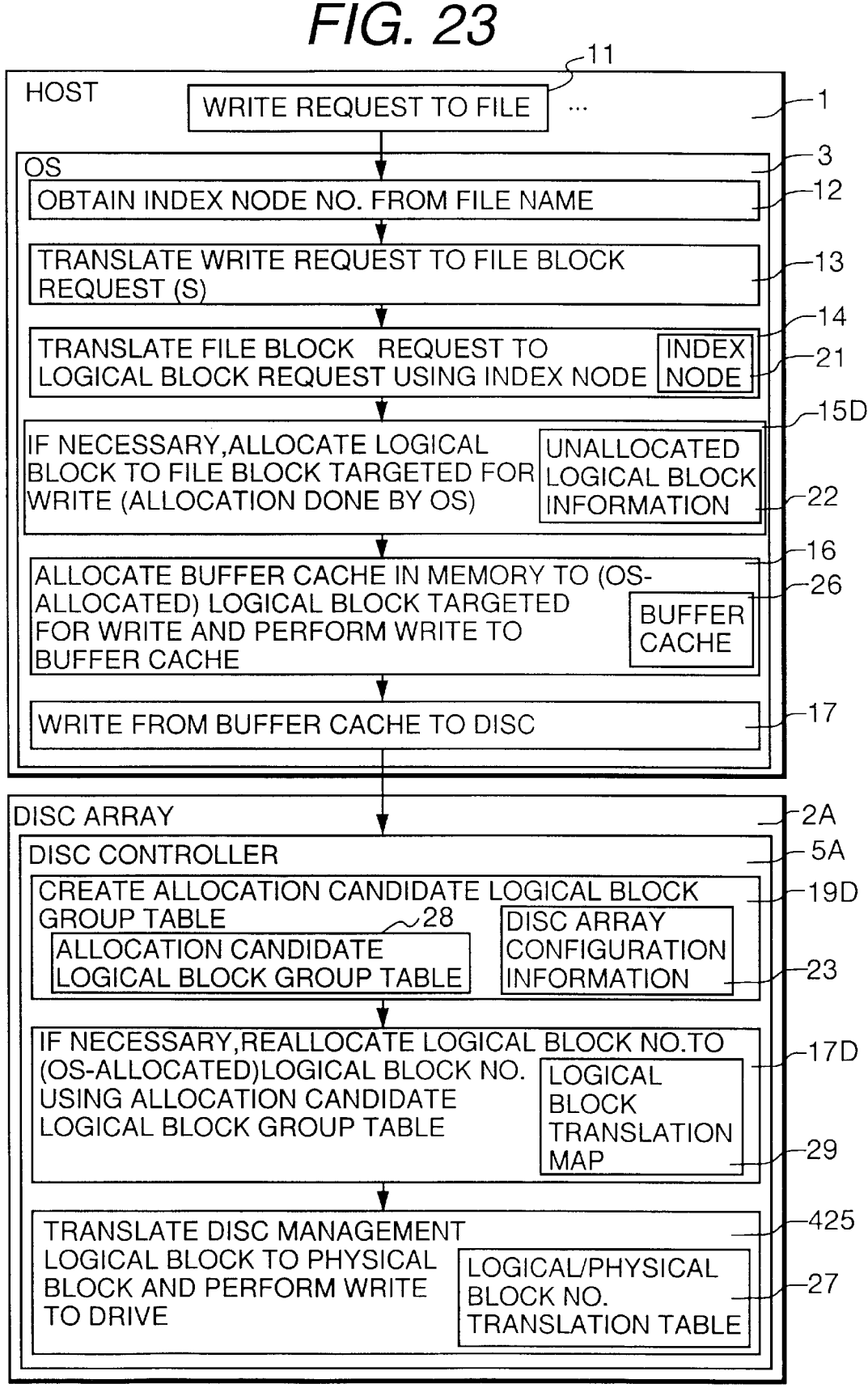
FIG. 23 is a schematic view showing the overall configuration of a sixth and an eleventh embodiment of the invention.
Figure 24:
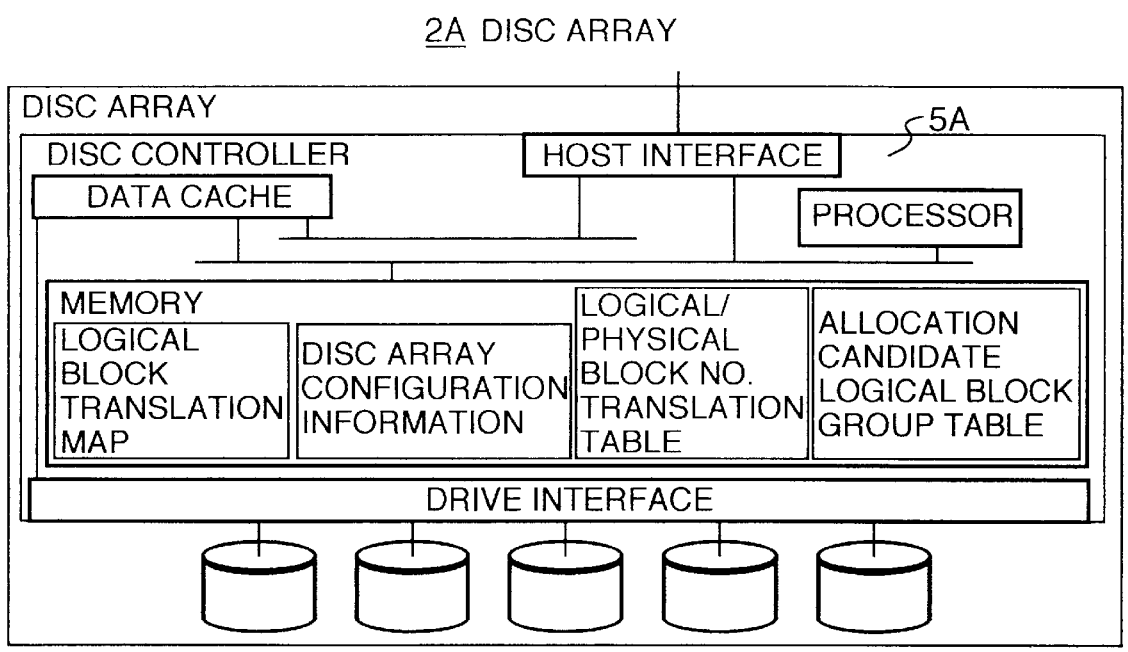
FIG. 24 is a schematic view depicting devices constituting the sixth and the eleventh embodiment.

FIG. 23 outlines the overall configuration of the sixth embodiment of the invention. FIG. 24 is a schematic view depicting devices constituting the sixth embodiment.

In the fifth embodiment of FIG. 18, the disc write process 17C translates the locations of allocated logical blocks. By contrast, the sixth embodiment performs the same process using a disc controller 5A in a disc array 2A in such a manner that the number of disc drives operating in parallel in the disc array 2A will be maximized. Specifically, a process 17D in FIG. 23 uses the logical block translation map 29 to translate the logical block numbers allocated by the operating system of the host into reallocated logical block numbers.

The sixth embodiment, like the fifth embodiment of FIG. 18, translates logical blocks using the disc array configuration information 23, logical block translation map 29, and allocation candidate logical block table 28. As discussed with reference to FIG. 18, the sixth embodiment regards a logical block number before location translation as an operating system-allocated logical block number, and a translated logical block number as a reallocated logical block number. Using an index node, the process 14 associates the operating system-allocated logical block number with a file block number. The reallocated logical block number represents a logical block corresponding to a logical block number in a disc drive of the disc array 2.

As shown in FIG. 24, a memory that stores various tables and a disc array control program retains the logical block translation map 29, disc array configuration information 23, logical/physical block number translation table 27, and allocation candidate logical block group table 28.

Referring to FIG. 23, suppose that a new logical block needs to be allocated to the file block to be written to the disc array 2A under the operating system 3. In that case, the logical block allocating process 15D selects an appropriate unallocated logical block from the unallocated logical block information 22 and allocates that block anew as an operating system-allocated logical block. At this point, the operating system need not become aware of the logical block in question as the operating system-allocated logical block. That is, the processing involved is the same as that of conventional logical block allocation.

A write to the disc array 2A is carried out by designating an operating system-allocated logical block. In the disc array 2A, the disc controller 5A receives from the host a write request regarding the operating system-allocated logical block. Using the logical block translation map 29, the disc controller 5A translates the operating system-allocated logical block number into a reallocated logical block number. Referring further to the logical/physical block translation table 27, the disc controller 5A translates the reallocated logical block number into a physical block number, i.e., a physical address in one of the disc drives 4 constituting the disc array 2A. An example of the logical/physical block translation table 27 is shown in FIG. 8, and an exemplary logical block translation map 29 is illustrated in FIG. 22. The process 17D for reallocating logical blocks is the same as the process 17C (FIG. 21) described in connection with the fifth embodiment of FIG. 18.

With the sixth embodiment, the disc controller 5A controls two kinds of translation: from operating system-allocated logical blocks to reallocated logical blocks, and from reallocated logical blocks to physical blocks. For that feature to be implemented, the logical/physical block translation table 27 may include fields representing the function of the logical block translation map 29. An example of such a logical/physical block translation table 27 is shown in FIGS. 26(*a*) and 26(*b*). The logical/physical block translation table 27 comprises an intra-drive physical block number column 241, drive information 242, and a logical block number table 244. The intra-drive physical block number column 241 indicates intra-drive physical block numbers each representing an address at which a data block or parity is stored in a disc drive. The drive information 242 indicates the numbers of the disc drives constituting the disc array. In the disc controller of the disc array, the table 27 is used to translate the logical block number allocated by the operating system of the host to a reallocated logical block number, to a drive number and to an intra-drive physical block number.

Figures 26A, 26B:
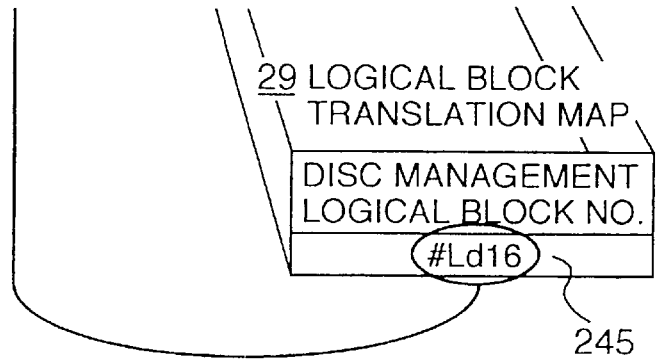
FIGS. 26(a) and 26(b) is an illustration of a logical/physical block number translation table.

Given an operating system-allocated logical block number from the host, the drive controller checks the corresponding entry in the logical block number table 244, and acquires the reallocated logical block number 245 contained in that entry. Using the reallocated logical block number 245 thus found, the disc controller checks the corresponding entry in the logical block number table 244 to reach the intra-drive physical block number column 241 and drive information 242, whereby the relevant drive number and intra-drive physical block are acquired. For example, in FIG. 26(a), suppose that a write request to the operating system-allocated logical block number #2 is received from the host. In that case, the disc controller obtains the reallocated logical block number #Ld16 by checking the entry 245 of the logical block #L2 in the logical block number table 244, as shown in FIG. 26(b). The disc controller then checks the intra-drive physical block number column 241 and drive information 242 corresponding to the logical block number #Ld16, to acquire the drive number #D1 and intra-drive physical block number #Y4.

In the manner described, the sixth embodiment also averages as much as possible the write requests involving logical block allocation to the disc drives in the disc array.

VARIATION OF THE SIXTH EMBODIMENT (1) As with the variation of the fifth embodiment, the logical block translation map may be statically prepared in advance. The static preparation of the map is done beforehand by the same process as that in the third embodiment of preparing the logical block allocation sequence list 22A and of creating the logical block translation map on the basis of that list 22A. This map associates the allocation sequence 92 shown in FIG. 16 with the logical block numbers 93 given in FIG. 17.

In the example of FIG. 22, there are 20 combinations of operating system-allocated logical block numbers 241 (#Li0–#Li19) with reallocated logical block numbers 242. The combinations are conducive to mechanical translation, as described in connection with the third embodiment.

SEVENTH EMBODIMENT

The seventh embodiment allows the writes of a plurality of sequential data blocks to be carried out without reading the old parity regarding these blocks and in such a manner that as many data blocks as the total number of the configured disc drives will be subsequently read in parallel.

Figure 29:
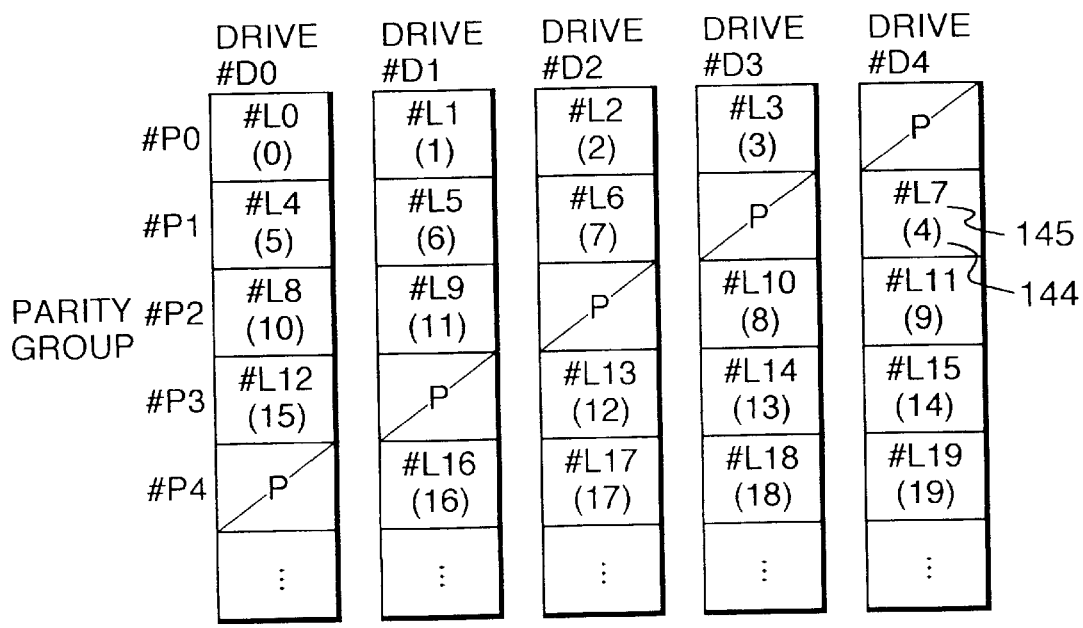
FIG. 29 is a schematic view showing how logical blocks are allocated.
Figure 30:
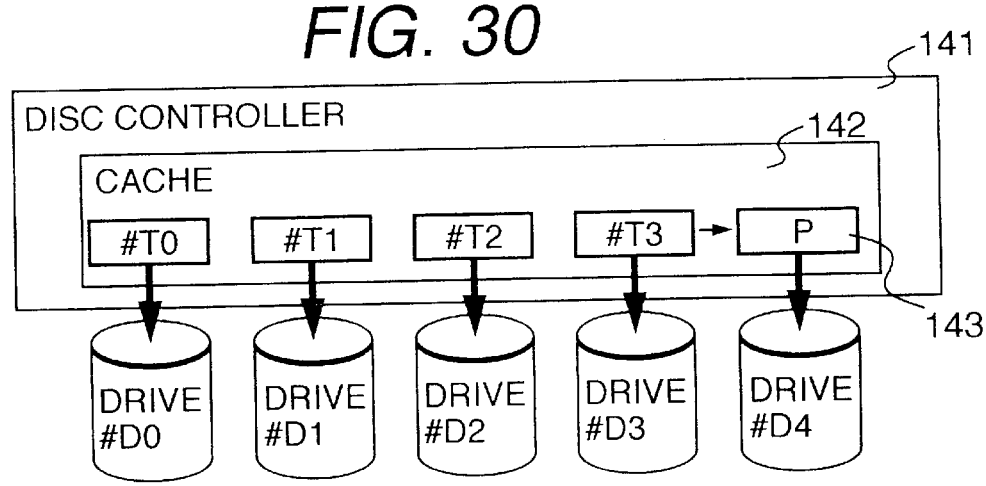
FIG. 30 is a schematic view illustrating the effects of the seventh embodiment.

Specifically, when logical blocks are to be allocated to data blocks, these data blocks are divided into data block groups each belonging to a single parity group. In order for a plurality of data blocks (e.g., #T0 through #T3) in each data block group to belong to the same parity group, the data block group in question is collectively allocated the physical blocks corresponding to a group of logical block numbers belonging to different disc drives, e.g., physical blocks with logical block numbers #L0 through #L3 in FIG. 29. The writes of these data blocks are then carried out in this setup. The disc array generates parity for the multiple data blocks #T0 through #T3 in the data block group, and writes the data blocks #T0 through #T3 as well as the generated parity to a plurality of disc drives #D0 through #D4 in parallel (see FIG. 30). In the RAID level 5 disc array, writing individual data blocks independent of one another generally requires that their old parity be retrieved for check. With the seventh embodiment, however, the reading of the old parity is not necessary because the disc controller possesses the data blocks commensurate with the parity groups.

When a subsequent group of data blocks, e.g., #T4, #T5, #T6 and #T7, are to be allocated the next group of logical blocks, the subsequent data block group is allocated illustratively physical blocks #L7, #L4, #L5 and #L6, in that order starting from the block #L7 in the disc drive holding the parity regarding the preceding data block group. With the above arrangements in place, it is possible at data block read time to read in parallel the preceding data block group (#T0, #T1, #T2, #T3) and the first data block #T4 of the subsequent data block group (see FIG. 31). In other words, it is possible to read as many data blocks as the total number of the disc drives configured in the disc array. This is the maximum number of data that may be read in parallel from the disc array.

Figure 27:
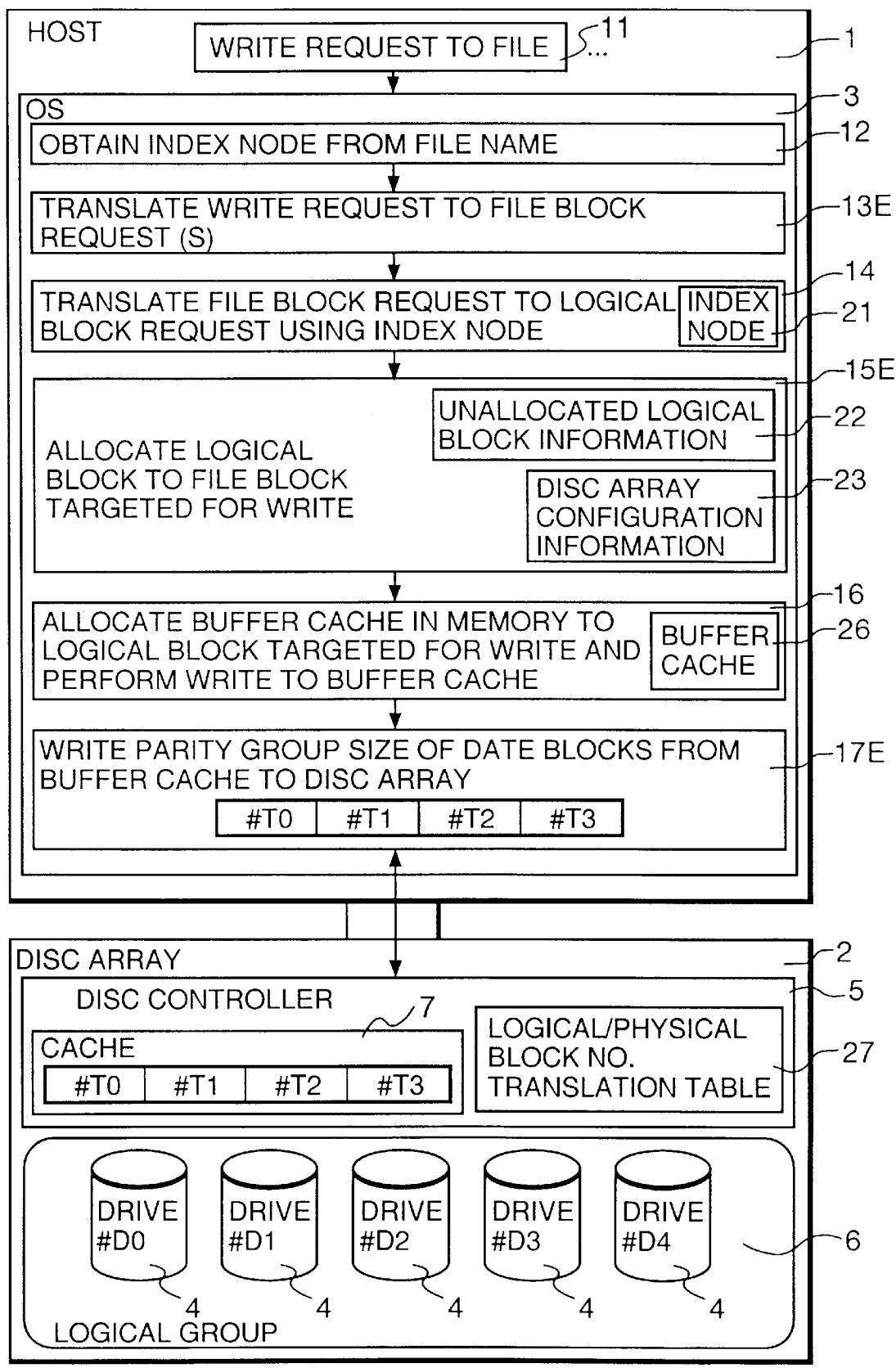
FIG. 27 is a schematic view sketching the overall configuration of a seventh embodiment of the invention.

FIG. 27 sketches the overall configuration of the seventh embodiment of the invention. To implement the seventh embodiment requires that the disc controller 5 incorporate a cache memory 7 in which to retain temporarily a data block group supplied collectively from the operating system 3. The disc controller 5 also needs to be structured so as to generate parity from that data block group and to write the generated parity and the multiple data blocks of the group to disc drives #D0 through #D4 in parallel. Alternatively, the cache memory 7 may be furnished as a temporary data storage location in a parity generation circuit.

What makes the seventh embodiment different from the first in terms of software configuration lies in two processes: a logical block allocating process 15E, and a disc write process 17E. In the process 13E of FIG. 27, it may happen that a file write request 11 exceeds in its scope the size of the parity group (stripe size multiplied by the data drive count) in the disc array 2A. In that case, the downstream process 15E is notified of the parity group size being exceeded.

Given a write request for allocating a new logical block to a file block, the logical block allocating process 15E selects an appropriate unallocated logical block from the unallocated logical block information 22 and allocates that logical block anew. What takes place here for logical block allocation is depicted in FIG. 28.

Figure 28:
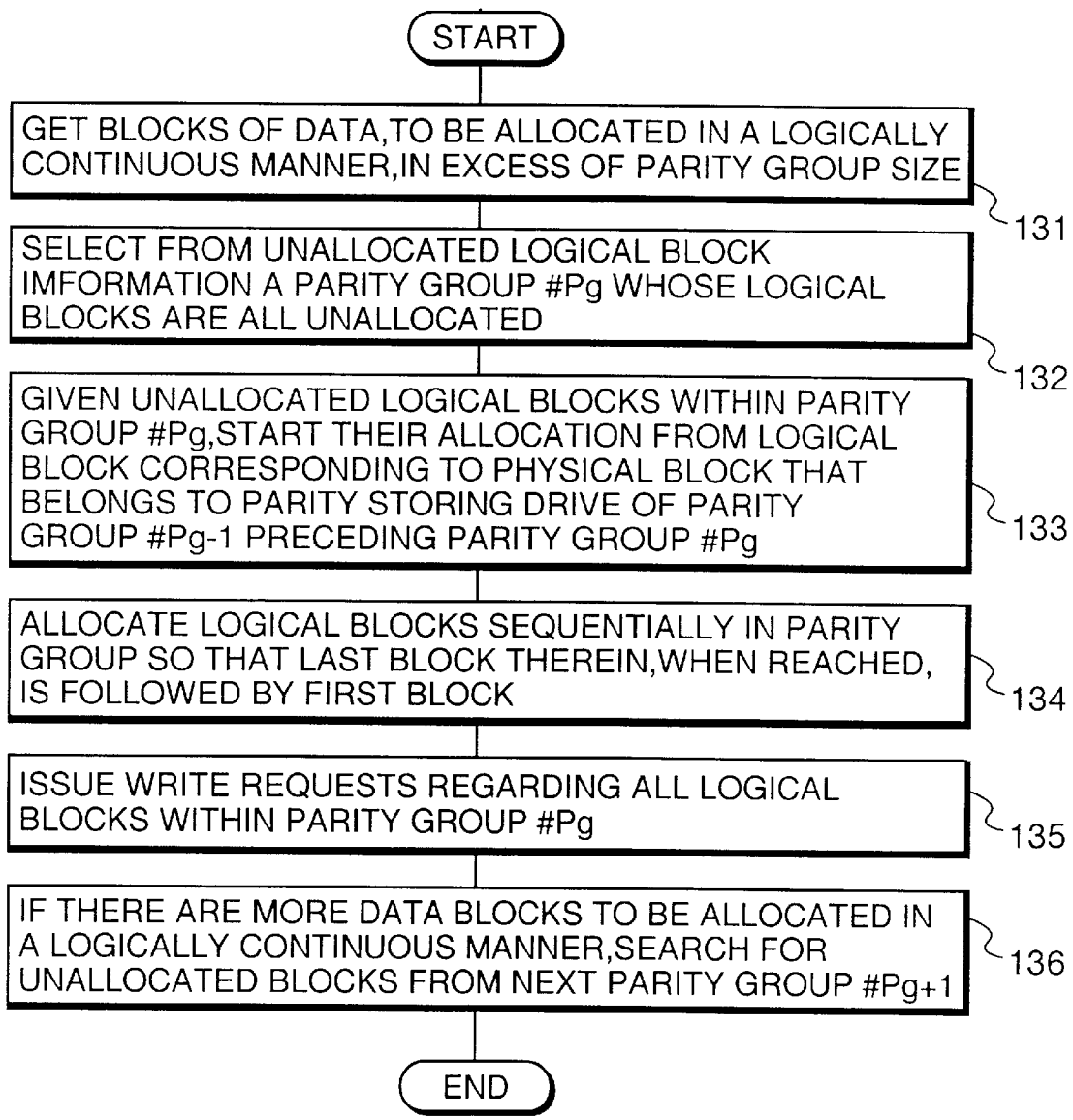
FIG. 28 is a flowchart of steps for logical block allocation processing.

Step 131 in FIG. 28 is notified from the process 13E of FIG. 27 that there exist a plurality of data blocks to be allocated regions and that the total size of the multiple data blocks exceeds the parity group size (stripe size multiplied by the data drive count) of the disc array 2. Step 132 selects from the unallocated logical block information a parity group whose entire physical blocks correspond to unallocated logical blocks. If there exists no parity group meeting the condition that all logical blocks are to be unallocated, unallocated logical blocks may be allocated one at a time as in the case of the first embodiment, or unallocated logical blocks may be allocated conventionally. Another alternative is to select a parity group of which as many logical blocks as possible are unallocated. In this case, the subsequent processes are arranged to proceed by skipping the already allocated logical blocks. When there is a parity group that meets the condition, step 133 is reached in which all logical blocks of the parity group are allocated sequentially to the data blocks. What characterizes the seventh embodiment is that in allocating these logical blocks, the embodiment first allocates the logical block corresponding to the physical block that belongs to the parity storing drive of the parity group (#Pg-1) preceding the parity group (#Pg) subject to the ongoing allocation. With the first logical block allocated, the logical blocks which may exist in the parity group and correspond with the physical blocks subsequent to the first logical block are allocated sequentially, until the logical block corresponding to the last physical block in the parity group #Pg is reached. Then there are allocated sequentially the logical blocks ranging from the logical block corresponding to the first physical block in the parity group #Pg, to the logical block corresponding to the physical block preceding the logical group within the parity storing drive (step 134). Suppose that in FIG. 29, the physical blocks of the parity group #P0 are to be allocated corresponding logical blocks. In this case, the physical blocks #L0 through #L3 are allocated their logical blocks. When the physical blocks of the parity group #P1 are to be allocated corresponding logical blocks, the physical block #L7 in the disc drive #D4 holding the parity of the parity group #P0 is first allocated a logical block, followed by physical blocks #L4 through #L6 being allocated their logical blocks. Thereafter, when the physical blocks of the parity group #P2 are to be allocated corresponding logical blocks, the physical block #L10 to #L11 in the disc drive #D3 holding the parity of the parity group #P1 are first allocated logical blocks, followed by physical blocks #L8 to #L9 being allocated their logical blocks. As a result, the process 15E allocates all logical blocks in each parity group in the allocation sequence 144 illustratively shown in FIG. 29 ((0), (1), (2), etc.).

When all physical blocks in the same parity group have been allocated the corresponding logical blocks regarding the multiple data blocks, step 135 in FIG. 28 starts the buffer cache write process 16 of FIG. 27. After this, the above steps are repeated for the parity group #Pg+1 in step 136 if there exist more data blocks than the parity group size.

Returning to FIG. 27, the process 16 writes to the buffer cache 26 the multiple data blocks allocated to the logical blocks corresponding to all physical blocks in the same parity group. The process 17E transfers a plurality of data write requests from the buffer cache 26 to the disc array 2 either collectively for the entire parity group or sequentially.

In the disc array 2, the disc controller 5 receives from the host 1 logical block write requests regarding all physical blocks in the parity group. The disc controller 5 places the relevant write data temporarily in the cache memory 7, and generates parity from the write data. The disc controller 5 then writes both the write data and the generated parity to a plurality of disc drives 4 in parallel.

Figure 31:
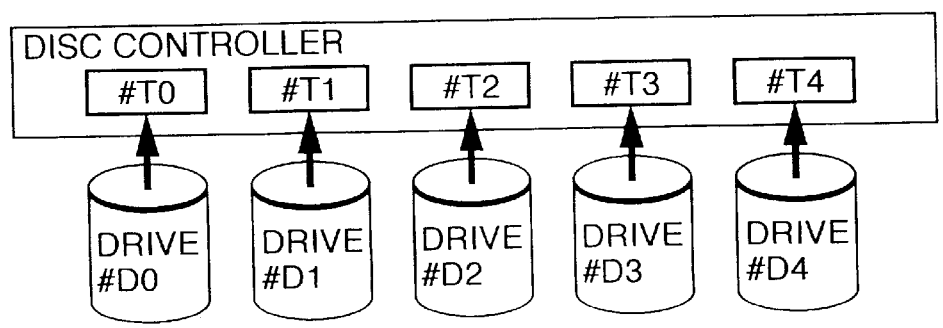
FIG. 31 is another schematic view depicting the effects of the seventh embodiment.
Figure 39:
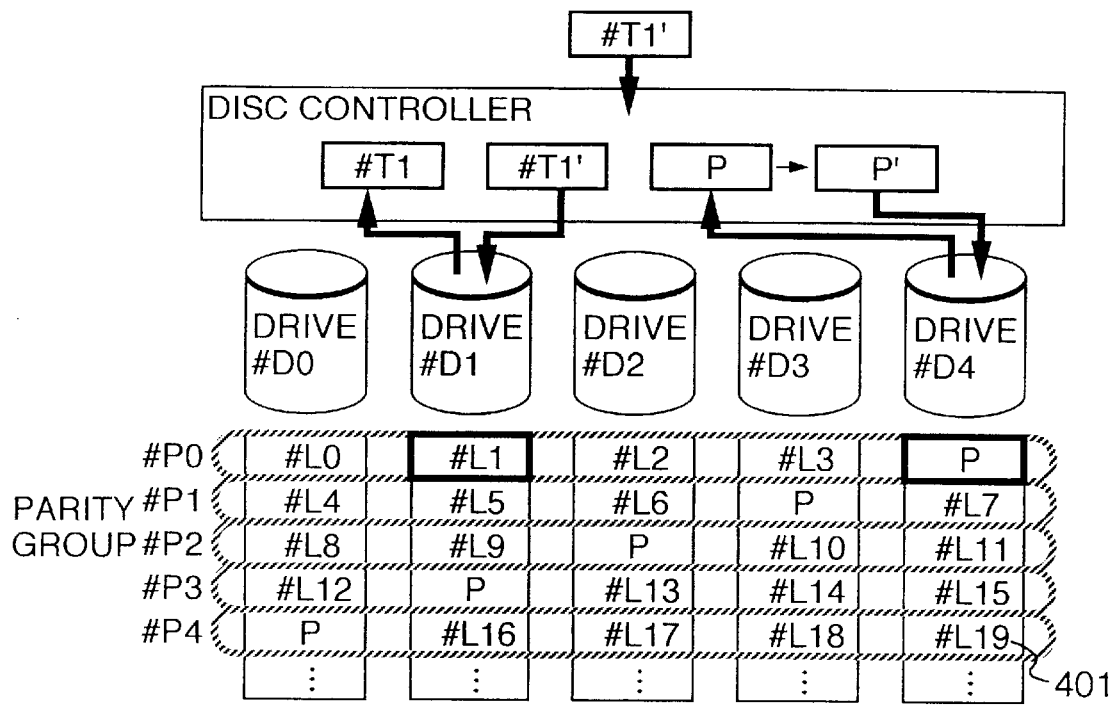
FIG. 39 is a schematic view showing a conventional RAID level 5 setup.
Figure 40:
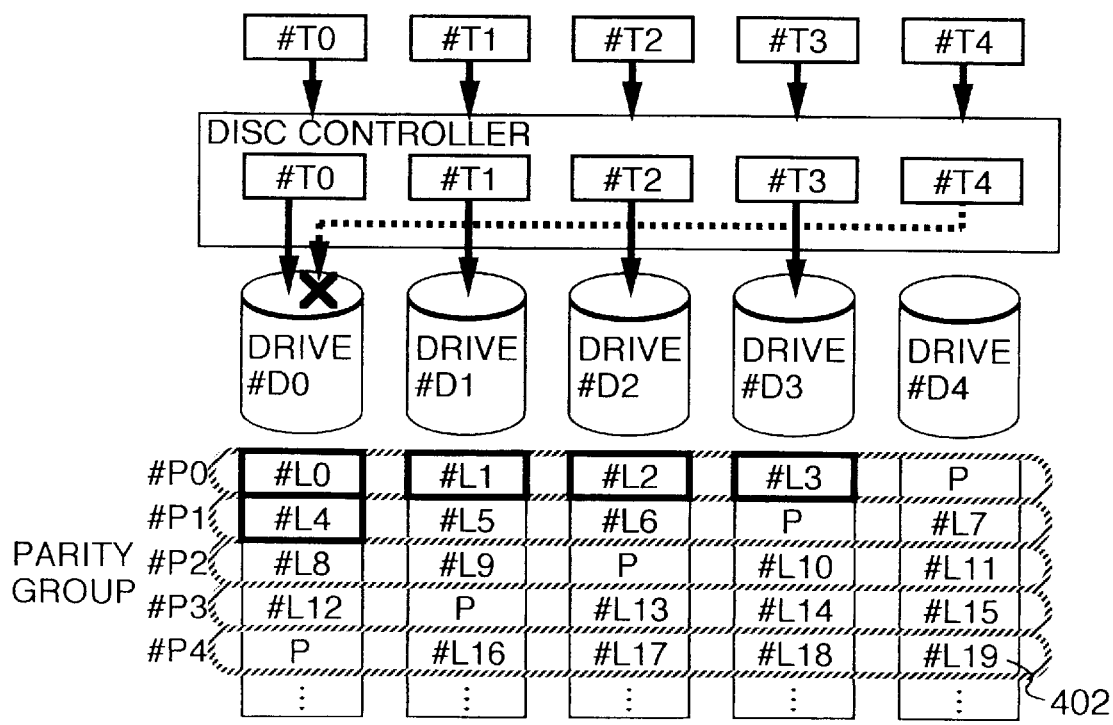
FIG. 40 is a schematic view indicating a problem associated with conventional techniques.
Figure 41:
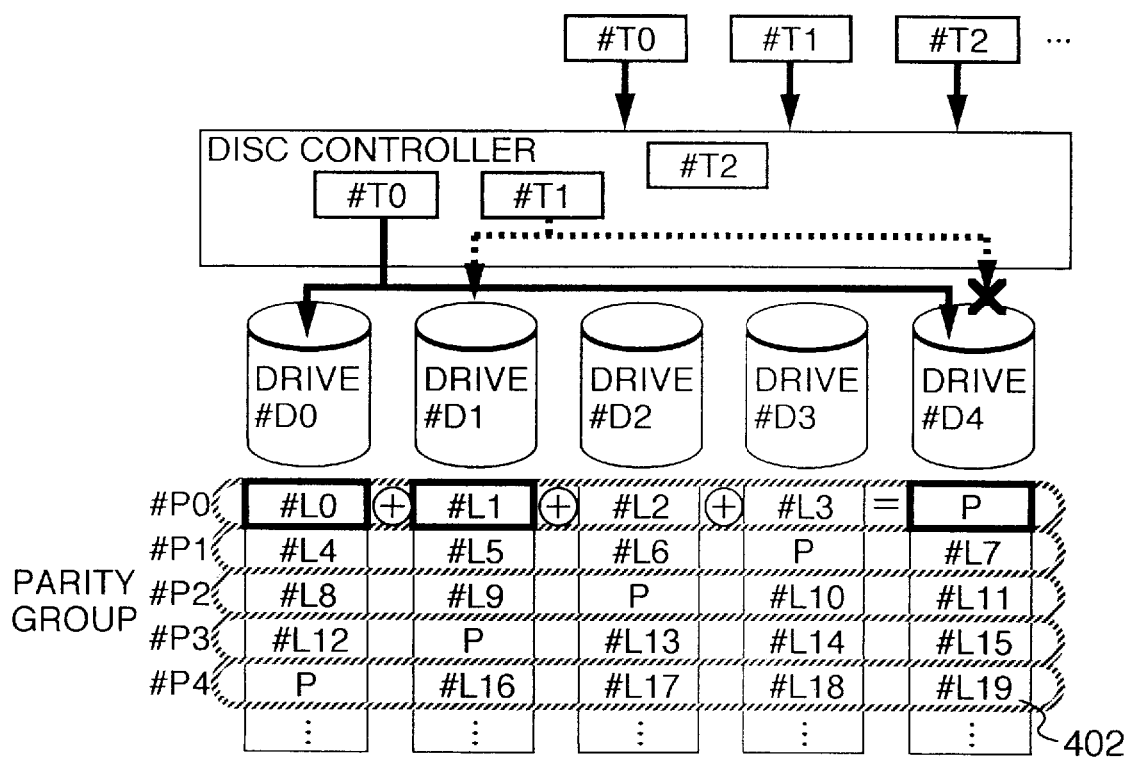
FIG. 41 is a schematic view illustrating another problem associated with conventional techniques.

As a result of the processing above, the seventh embodiment suppresses the write overhead that would otherwise stem from the reads of old data blocks and old parity discussed with reference to FIG. 39. With the seventh embodiment, the number of disc drives operating in parallel is 5 (number of parallel write requests handled=4). Whereas sequential reads of data blocks #T0 through #T4 entail the number of disc drives operating in parallel being 4 because the data blocks #T0 and #T4 exist in the disc drive #D0, the parallel operating disc drive count may be raised to 5 (number of parallel reads handled=5) when the disc drive #D4 holds the data block #T4 as shown in FIG. 31.

EIGHTH EMBODIMENT

Figure 32:
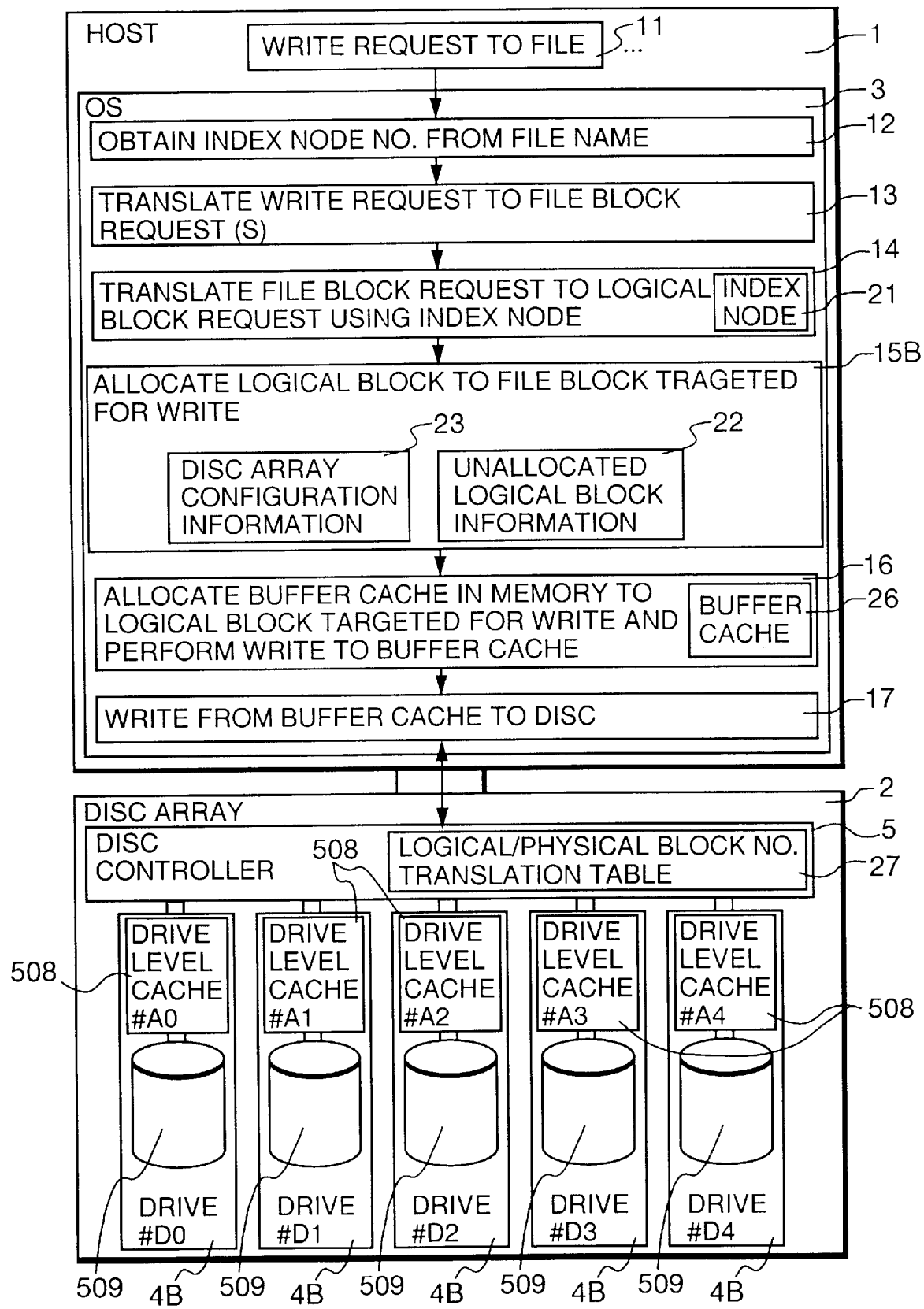
FIG. 32 is a schematic view showing the overall configuration of an eighth embodiment of the invention.

FIG. 32 shows the overall configuration of the eighth embodiment of the invention. What characterizes the eighth embodiment is that, with a drive level cache 508 furnished in each of the disc drives 4B constituting the disc array 2, the logical block allocating process 15B continuously allocates logical blocks in disc drives in the unit of the size of data accommodated in the drive level cache for a single I/O operation. This feature allows each of the I/O operations of disc drives to be performed collectively using the drive level cache arrangement during continuous input and output of data. This not only improves the performance of individual disc drives but also enhances the performance of the disc array as a whole.

The eighth embodiment is effective where the disc drives constituting the disc array have a drive level cache each, where the disc drives are arranged to utilize their caches to conduct their I/O operations collectively, and where the unit of the collectively handled operations includes a plurality of blocks.

The hardware configuration of the eighth embodiment is outlined below. What makes the eighth embodiment different from the first lies in the disc array 2. The disc array 2 comprises a disc controller 5 and a plurality of disc drives 4B. Each of the disc drives 4B is characterized by the provision of a drive level cache 508 in addition to a magnetic storage medium 509. In operation, the disc controller 5 uses the disc drives 4B to handle read/write requests with respect to physical blocks therein, as follows: In processing a read/write, it may become necessary to read a physical block from a disc drive 4B. In that case, the disc drive 4B reads into its drive level cache not only the physical block in question but also the nearby physical block data in the same track or cylinder (of the storage medium), and forwards the requested physical block data to the disc controller 5. If a read request occurs regarding the vicinity of the just-read physical block while the jointly-read nearby physical block data are still in the drive level cache 508, the corresponding data may be transferred at high speed from the drive level cache 508 to the disc controller 5.

The software configuration of the eighth embodiment is outlined below. A write by the operating system 3 to the disc array 2 involves: a process 12 for translating a file name to an index node, a process 13 for translating a file write request to a file block write request, a process 14 for translating a file block to a logical block, a logical block allocating process 15B, a buffer cache allocating process 16, and a disc write process 17.

Given a write request requiring the allocation of new logical blocks to file blocks, the logical block allocating process 15B first selects appropriate unallocated logical blocks from the unallocated logical block information 22 and allocates anew the logical blocks thus selected. The process 15B performs the steps outlined in FIG. 35 when allocating logical blocks to file blocks.

Figure 35:
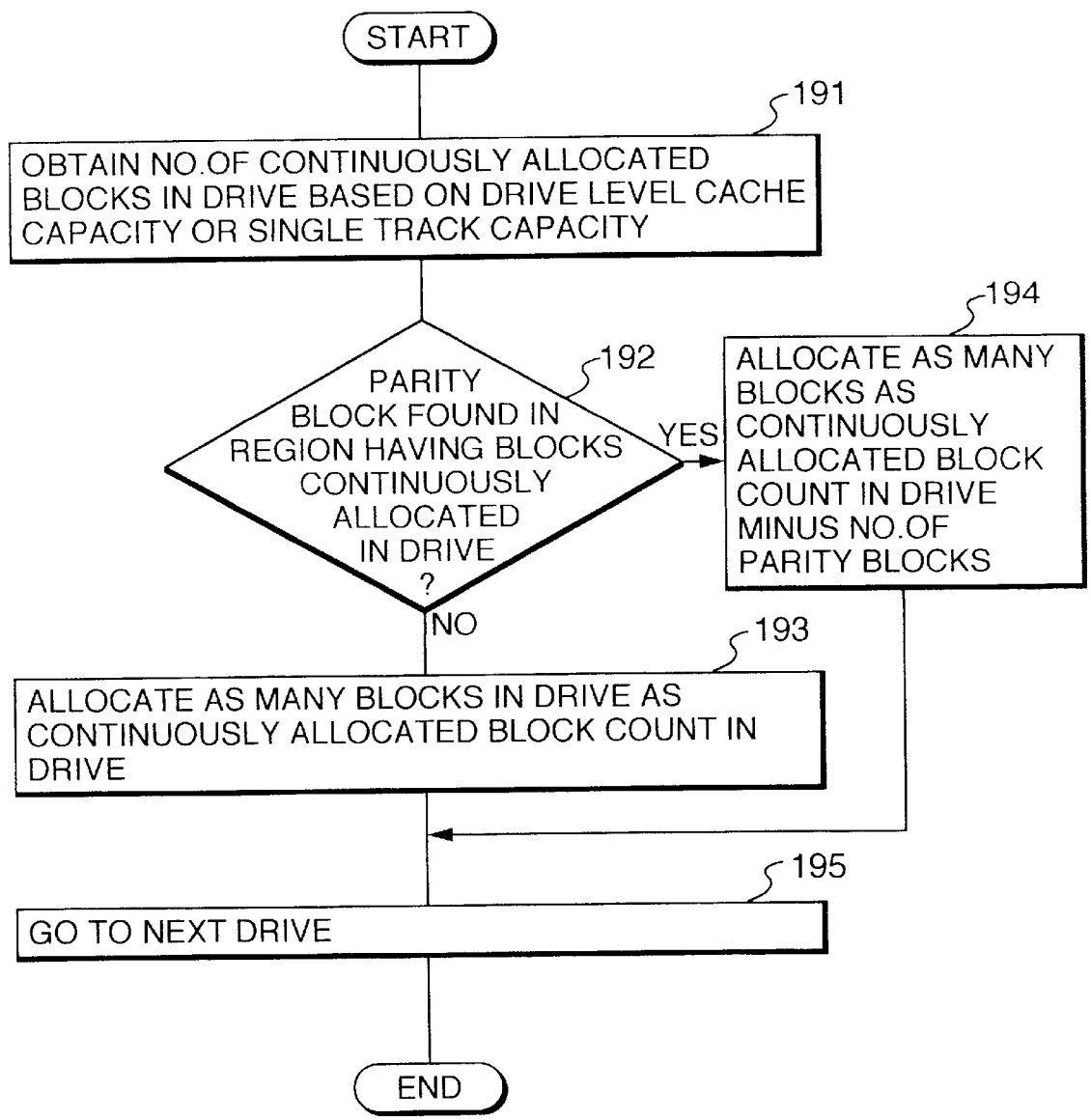
FIG. 35 is a flowchart of steps for region allocation processing.

How the logical block allocating process 15B is carried out will now be described with reference to FIG. 35. The logical block allocating process 15B comprises two processes: a process for determining the amount of continuously allocated blocks in a disc drive (step 191), and a process for continuously allocating blocks in the disc drive (step 192). Step 191 obtains the amount of data to be read by a disc drive 4B collectively into its drive level cache 508 (i.e., the number of blocks continuously allocated in the disc drive) in accordance with the amount of automatically prefetched data in the disc drive, as well as with the capacity of each track in the disc drives 4B constituting the disc array 2 (the track capacity is derived from the disc array configuration information 23). Since the amount of automatically prefetched data in the disc drive is generally considered equal to the single track capacity, the number of blocks allocated continuously in the disc drive is determined by how many blocks exist in each track. In step 192, a check is made to see if any parity region is included in the region where blocks are continuously allocated in the disc drive. If no parity region is included, step 193 is reached. In step 193, as many continuously allocated blocks in the disc drive as the block count determined in step 191 are allocated continuously in the disc drive. If parity regions are found to be included, step 194 is reached. In step 194, as many blocks as the block count determined in step 191 minus the number of parity regions found in step 192 are allocated in the disc drive.

Figure 33:
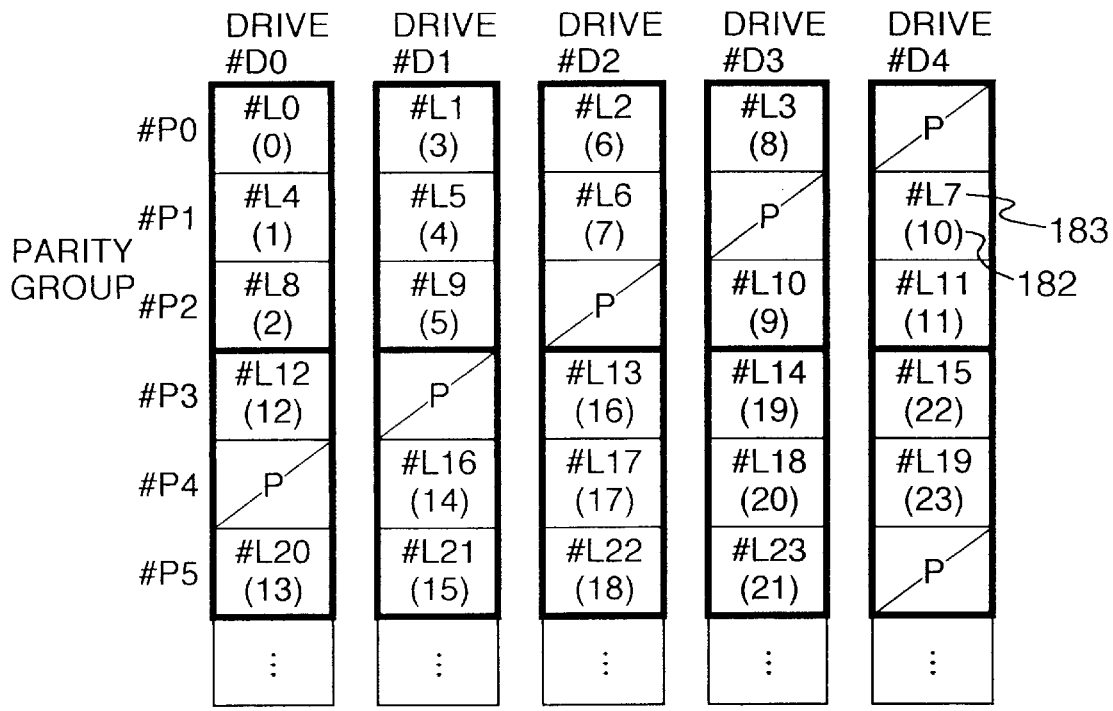
FIG. 33 is a schematic view indicating how logical blocks are allocated.
Figure 34:
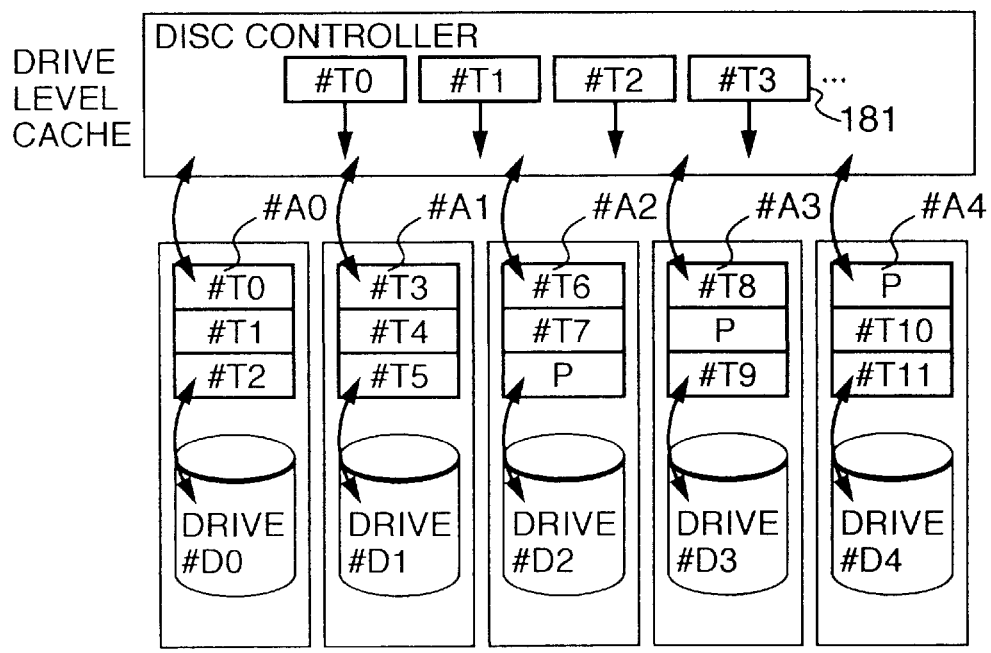
FIG. 34 is a schematic view presenting the effects of the eighth embodiment.

The effects of the allocating method above are explained below with reference to FIGS. 33 and 34. FIG. 34 shows an example in which the amount of collectively read data via a drive level cache is one track comprising three blocks. When a read of one block from a disc drive is requested, one track of data including the block in question is automatically read from the drive. Where the process of FIG. 35 is carried out for logical block allocation, logical blocks are allocated to the physical blocks in FIG. 33 in the sequence 182 ((0), (1), (2), etc.).

In FIG. 34, suppose that the disc controller receives write requests regarding logically continuous data blocks #T0, #T1, #T2, #T3, . . . (which are allocated physical blocks (#L0), (#L4), (#L8), (#L1, etc., respectively), such as requests 181. In that case, the drive level cache #A0 holds data blocks #T0, #T1 and #T2 to be stored into physical blocks (#L0), (#L4) and (#L8); the drive level cache #A1 accommodates data blocks #T3, #T4 and #T5 to be stored into physical blocks (#L1), (#L5) and (#L9). A write requires reading the parity block of the parity group to which the logical block targeted for the write belongs. For this reason, the drive level caches #A2, #A3 and #A4 receive a parity block each. At the same time, each of the drive level caches accommodates not only the parity block but also the data contained in the physical blocks located physically close to that parity block (i.e., existing on the same track). In this example, the drive level cache #A2 receives the data blocks #T6 and #T7 stored in the physical blocks #L2 and #L6 as well as the parity of the parity group #P2; the drive level cache #A3 admits the data blocks #T8 and #T9 held in the physical blocks #L3 and #L10 as well as the parity of the parity group #P1; the drive level cache #A4 gets the data blocks #T10 and #T11 retained in the physical blocks #L7 and #L11 as well as the parity of the parity group #P0. In this setup, the disc controller 5 issues read requests to the disc drives 4B in conjunction with subsequent read/write requests regarding logical blocks whose allocation sequence is 4 through 11. Because the target data already exist in the drive level caches, the transfer of the data may be executed at high speed from the caches to the disc controller. The allocation sequence used in the above example may be determined either dynamically during allocation or statically in advance.

NINTH EMBODIMENT

The ninth embodiment is an extension of the first embodiment, applicable where a disc array is split into a plurality of virtual disc drives (called logical units) for use. With the ninth embodiment, the numbers of different logical units are allocated to a plurality of write requests in such a manner that the requests may be executed in parallel as much as possible regarding the logical units. That is, given write requests for different logical units, the ninth embodiment determines logical units so that the disc drives involved will not coincide between requests, as with the first embodiment. The ninth embodiment is applied where write requests for individual logical units may not be the requests of writes to sequential data blocks but they are the requests to be allocated logical blocks sequentially with respect to a plurality of logical units.

Figure 37:
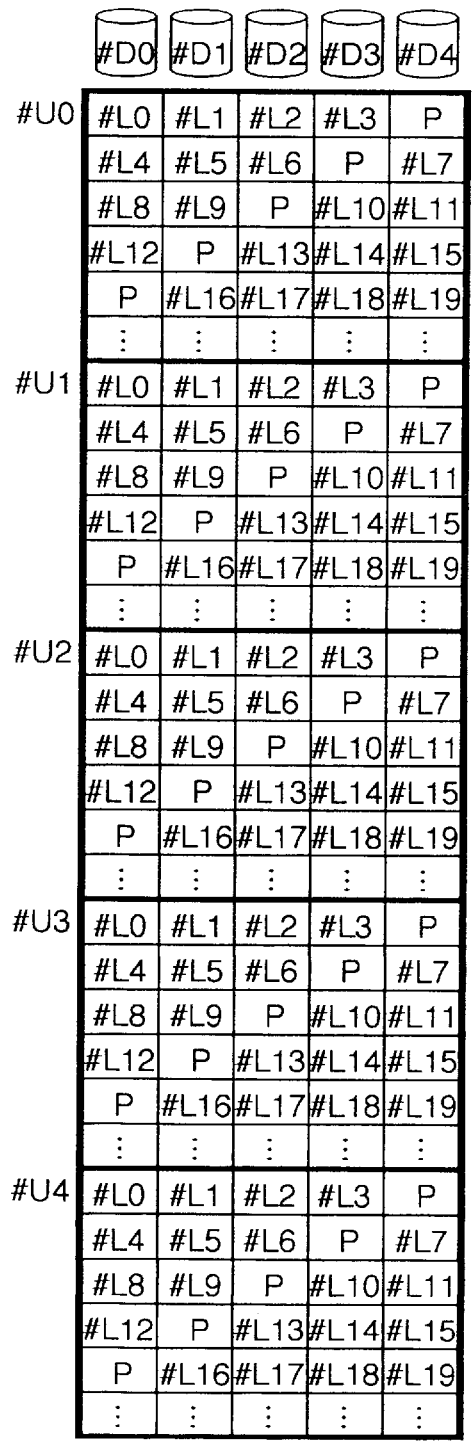
FIG. 37 is a schematic view showing how logical units are divided.

FIG. 37 shows an exemplary disc array to which the ninth embodiment is applied. In this example, the disc array comprises five disc drives #D0 through #D4 as with the first embodiment. The disc array is split into logical units #U0 through #U4. In each logical unit are physical blocks corresponding to logical block numbers #L0, #L1, etc., starting from the first location of the logical unit in question. To application programs that run on the host, the logical units appear as a plurality of different disc drives. The application programs independently supply the operating system with file block write requests to be executed on these logical units. The ninth embodiment controls the logical blocks to be allocated to independent write requests from a plurality of application programs so that these write requests may be executed in parallel as much as possible.

As described, the first embodiment controls the logical blocks to be allocated to a plurality of sequential file blocks designated by write requests issued by a host to the operating system. By contrast, the ninth embodiment controls the logical blocks to be allocated to write requests for designating the file blocks that belong to different files to be retained in different logical units. A plurality of write requests for designating such independent file blocks may be executed in parallel as long as the disc drives to which belong the logical blocks allocated to these file blocks do not coincide with the disc drives holding the parity of these logical blocks.

With the ninth embodiment, even if the preceding write request and the write request that follows require writes to different logical units, the disc drive to which belongs the logical block to be allocated to the ensuing write request and the disc drive holding the parity regarding the logical block in question are made different from the disc drive to which belongs the logical block allocated to the preceding write request and the disc drive holding the parity regarding that logical block.

The description that follows will focus on what makes the ninth embodiment different from the first embodiment. FIG. 1 referenced in connection with the description of the first embodiment will also be cited hereunder.

The ninth embodiment carries out on each logical unit the process 18 for creating a group of allocation candidate logical block lists in FIG. 1. Specifically, the logical block group of FIG. 13 is first created for each logical unit. Then an allocation candidate logical block list group is prepared with respect to the logical unit in question.

Figure 36:
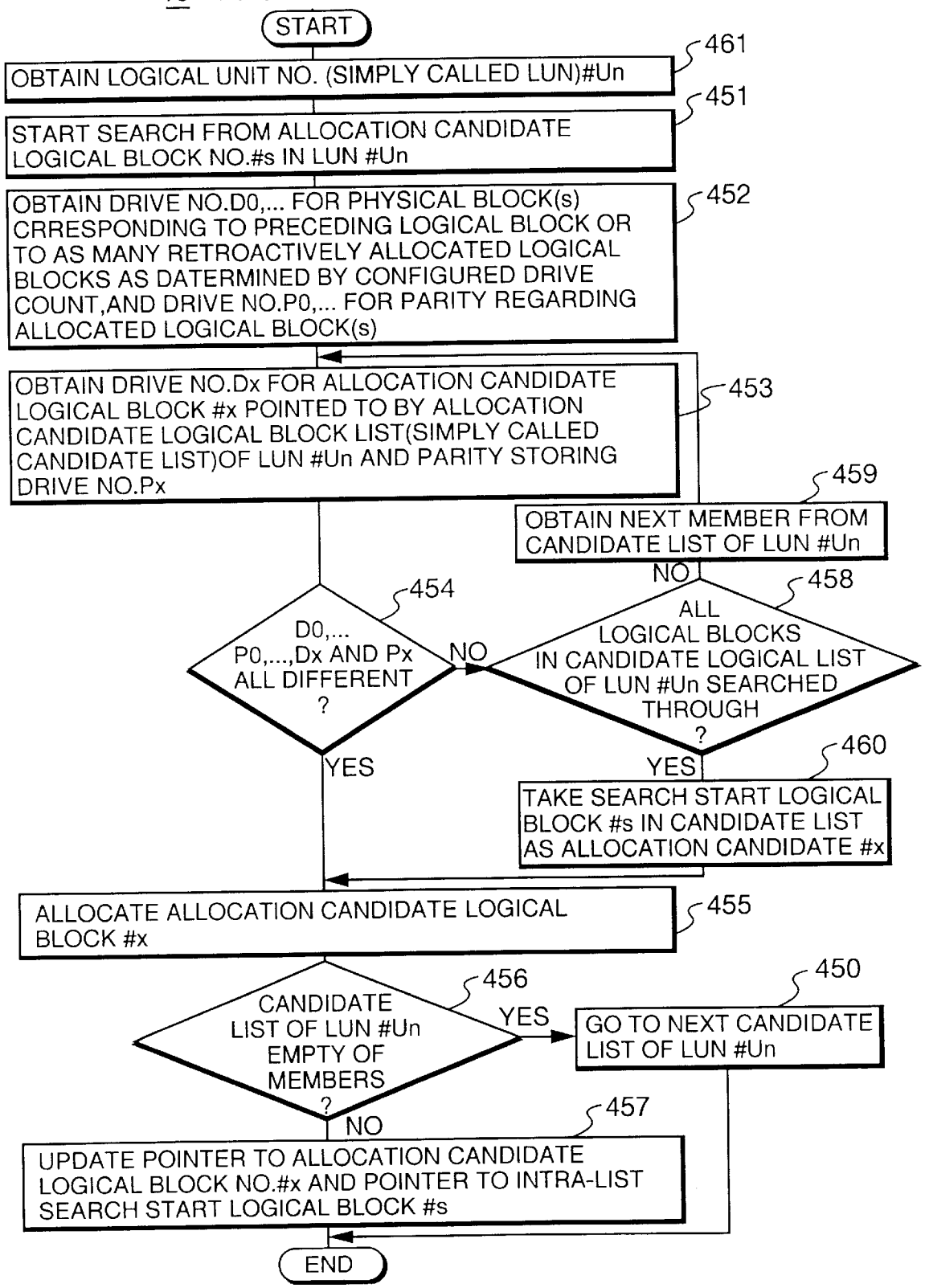
FIG. 36 is a flowchart of steps for allocating regions that are divided into logical units.

The logical block allocating process 15, indicated in FIG. 1 and detailed in FIG. 11 in connection with the first embodiment, is replaced by the process 15 of FIG. 36 for the ninth embodiment. The process 15 applies when a logical block is allocated to a file block of a file to be retained in a logical unit. In that case, of steps 450 through 461 constituting the process 15, those except for step 454 are executed like the corresponding steps in FIG. 11 on the basis of the allocation candidate logical block list generated for the logical unit in question. That is, when a logical block is to be allocated to a write request, allocation candidates are selected one by one from one of the allocation candidate logical block groups generated for the logical unit in question. In step 454, a check is made to see if each candidate can be allocated. One applicable logical block group is thus selected and allocated from the allocation candidate logical block group in question. The same process is also performed on subsequent write requests. When all candidates in one block group have been exhausted, the next allocation candidate logical block group is employed.

What takes place in step 454 is as follows: Irrespective of whether the logical unit requested by the current write request is the same as that requested by the preceding write request, a check is made to see if the disc drive to which belongs the physical block with the logical block number to be allocated to the current write request and the disc drive holding the parity regarding the logical block in question do not coincide with the disc drive to which belongs the physical block with the logical block number allocated to the preceding write request and the disc drive holding the parity regarding that logical block. In the process of FIG. 36, the result of the check in step 454 is referenced so that the logical block corresponding to the physical block in a disc drive not coinciding with the preceding write request is allocated as the ensuing logical block.

Illustratively, suppose that a plurality of write requests to be allocated logical blocks sequentially call for the execution of sequential writes to logical units #U0, #U1, etc. In that case, the first write request is allocated the physical block (#0) with the logical block number #L0 in the logical unit #U0. The second write request is allocated illustratively the physical block (#L10) in the logical unit #U1 on the disc drive #D3, i.e., the physical block such that its corresponding logical block and parity are retained in disc drives different from the disc drive #D0 to which the physical block (#L0) belongs as well as from the disc drive #D4 holding the parity regarding the logical block in question.

In the manner described, where two consecutively issued write requests call for writes to different logical units, the ninth embodiment can execute these requests in parallel. When the logical block group is selected as depicted in FIG. 13, the ninth embodiment, like the first, carries out in parallel a maximum number of write requests, the maximum write request count being determined by the number of the disc drives configured in the disc array.

VARIATION OF THE NINTH EMBODIMENT

The number of times step 454 is executed may be reduced preferably as follows: When the ninth embodiment finishes allocating a logical block to a write request requesting a write to a logical unit, step 457 is reached. Step 457 changes to the next block the search start position of the allocation candidate logical block group list for the logical unit in question. At this point, a modification is made so that the search start position of the allocation candidate logical block group list for another logical unit is also changed to the next block. For example, suppose that the physical block (#L0) with the logical block number #L0 on the disc drive #D0 in the logical unit #U0 is allocated to a write request. In that case, even if the next write request calls for a write to another logical unit (e.g., #U1), the first physical block (#L0) on the drive #D0 in the logical unit #U1 clearly does not meet the condition of step 454. That is, the check in step 454 is useless and wasted. Thus when a logical block in any logical unit is allocated to a write request, the search start position of the allocation candidate logical block group list for another logical unit is changed to the net logical block by this variation of the ninth embodiment. This eliminates the loss that may occur in step 454.

Suppose that a plurality of write requests to be allocated logical blocks sequentially call for sequential and cyclic writes to logical units #U0, #U1, #U2, #U3 and #U4. In that case, the sequence in which to allocate corresponding logical blocks to the physical blocks with respect to these write requests is as shown in FIG. 38. The numbers in FIG. 38 constitute the sequence in which the corresponding logical blocks are allocated to the physical blocks in the same logical unit. As illustrated, the first write request to the logical unit #U0 is allocated the physical block (#L0) in the logical unit #U0; the first write request to the logical unit #U1 is allocated the physical block (#L7) in the logical unit #U1 because the physical block #L7 meets the condition of step 454.

TENTH EMBODIMENT

The tenth embodiment controls the allocation of logical blocks so that the number of read or write requests waiting to be serviced by each of the disc drives may be averaged therebetween as much as possible.

How the tenth embodiment works will now be described with reference to FIG. 18. In the process 17C (FIG. 18) of the fifth embodiment detailed in FIG. 21, a comparison is made of the data storing disc drive for the preceding logical block number reallocated immediately before and of the parity storing disc drive regarding that logical block. That compare operation is intended to average as much as possible the number of write requests involving logical block allocation between disc drives. By contrast, the process of FIG. 25 for the tenth embodiment creates a logical block translation map so as to average, as much as possible between disc drives, the total number of read or write requests being executed or waiting to be executed (i.e., the total request count being represented by the request queue length).

Figure 25:
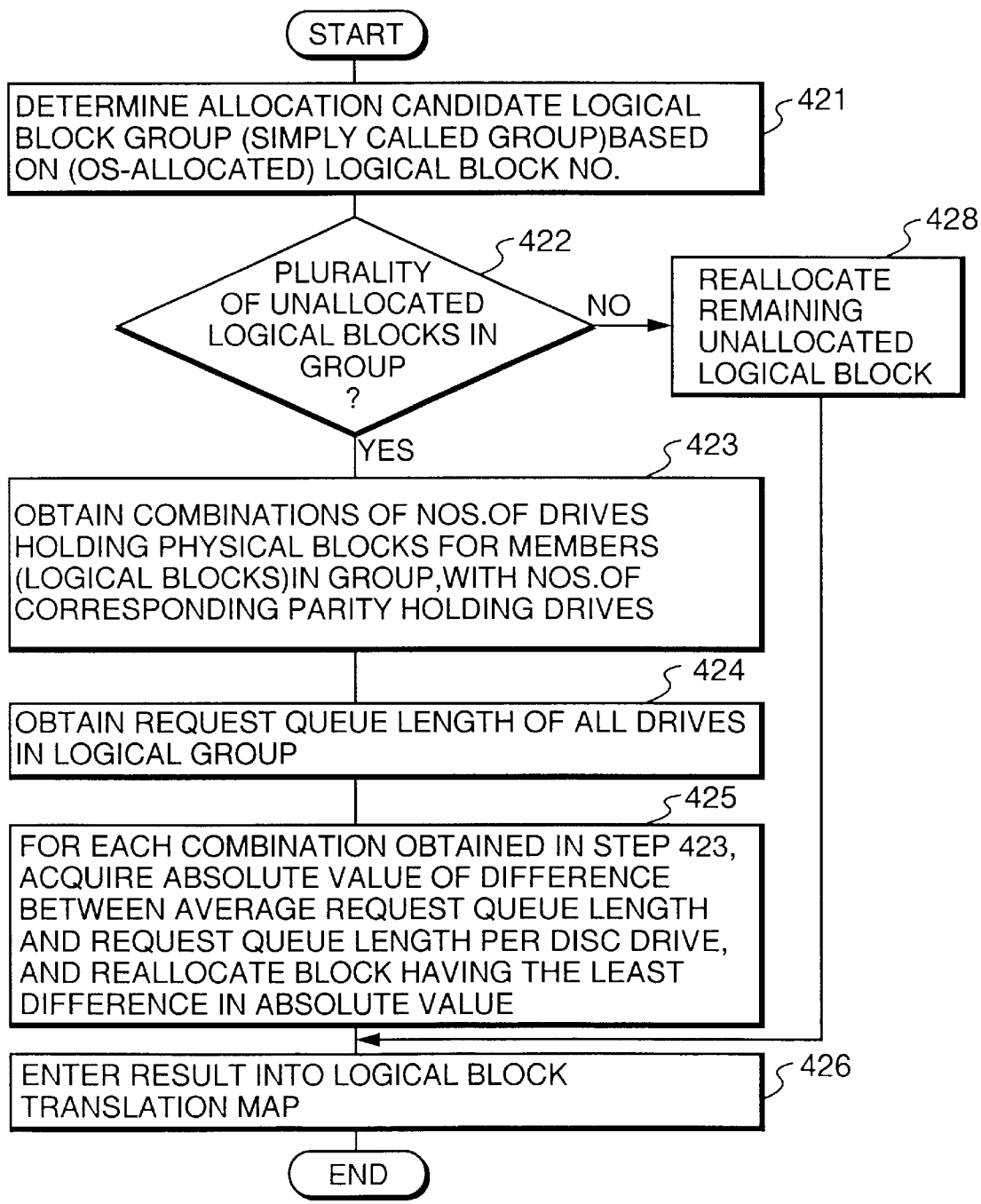
FIG. 25 is a flowchart of steps for logical block reallocation processing.

Step 421 in FIG. 25 takes an operating system-allocated logical block number and, using the allocation candidate logical block group table depicted in FIG. 20, acquires both the number of the allocation candidate logical block group to which the logical block in question belongs as well as the corresponding reallocated logical block. In step 422, a check is made with reference to the logical block translation map to see if there are a plurality of unallocated logical blocks in the allocation candidate logical block group in question. If there is only one unallocated logical block in the group, that logical block is associated unconditionally with the operating system-allocated logical block (step 428). If there are two or more unallocated logical blocks in the allocation candidate logical block group ("YES" in step 422), step 423 is reached. Step 423 obtains reallocated logical block numbers for all members in the allocation candidate logical block group, and acquires combinations of disc drive numbers and parity storing drive numbers for the current block. Step 424 obtains the total number of read or write requests waiting to be executed by each disc drive in the logical group. Step 425 acquires the average request queue length for each of the drive number combinations gained in step 423. For each combination obtained in step 423, step 425 first acquires the absolute value of the difference between the average request queue length and the request queue length per disc drive. These differences are compared between the combinations, and the block with the reallocated logical block number having the least difference is selected. The result of step 425 is entered into the logical block translation map in step 426.

In the manner described, logical block numbers are reallocated dynamically to the logical blocks allocated by the operating system in the process 15C. This averages, as much as possible between the disc drives, the total number of read or write requests being executed or waiting to be executed. Ultimately, it is possible to shorten in an averaged manner the execution time for each of numerous read or write requests.

ELEVENTH EMBODIMENT

Like the tenth embodiment, the eleventh embodiment controls the allocation of logical blocks so as to average, as much as possible between the configured disc drives, the number of read or write requests waiting to be executed thereby. Unlike the tenth embodiment and similar to the sixth, the eleventh embodiment utilizes a disc controller for effecting its controls.

The overall processing of the eleventh embodiment and the devices needed to carry out the processing are similar to those discussed in connection with the sixth embodiment. What makes the eleventh embodiment different from the sixth embodiment lies in the process 17D. With the sixth embodiment, the process 17D compares the data storing disc drive for the preceding logical block number reallocated immediately before and the disc drive storing the relevant parity, whereby the write requests involving logical block allocation are averaged as much as possible between disc drives.

With the eleventh embodiment, by contrast, the process 17D in FIG. 25 can reallocate (translate) logical blocks so as to average, as much as possible between the configured disc drives, the number of read or write requests being executed or waiting to be executed thereby.

In the embodiments described above, a file storing region is provided consecutively for each write request issued. Alternatively, it is also possible to furnish beforehand a file storing region of a designated size.

The embodiments above utilize magnetic disc drives as drives. Alternatively, any other drives may be utilized including optical disc drives and floppy disc drives. In place of the RAID level 5 disc array, disc arrays of other levels may be used as long as the disc array in question allows its configured disc drives to perform I/O processing independently of one another in response to I/O requests from the host. Needless to say, the five disc drives constituting the logical group in the above embodiments may be replaced by two or a larger, unrestricted number of drives.

As described, the invention increases the number of disc drives operating in parallel in a disc array during sequential read/write operations, whereby the speed of I/O operations is significantly enhanced.

What is claimed is:

1. In a disc array which comprises:

a plurality of disc storage devices for storing a plurality of error correcting data groups, each error correcting data group comprising a plurality of data and error correcting code data therefor, and an array controller for controlling execution of data read requests and data write requests for said plurality of disc storage devices, each disc storage device having a plurality of storage regions each for storing either data or error correcting code data, a plurality of storage regions included in said plurality of disc storage devices being divided into a plurality of groups of storage regions, wherein storage regions belonging to each group of storage regions belong to different ones of said plurality of disc devices and store a plurality of data and error correcting code data both belonging to a same error correcting data group, in such a manner that error correcting code data belonging to different error correcting data groups are dispersed in said plurality of disc devices, a method for allocating one of said plurality of storage regions within said plurality of disc storage devices to data to be written therein, comprising the steps of:

storing allocation status information designating a plurality of unallocated storage regions for storing data, not allocated to any data, within a plurality of storage regions within said plurality of disc storage devices; and allocating a plurality of unallocated storage regions which satisfy a predetermined condition, to a plurality of sequentially-ordered data to be written, said allocating being executed sequentially according to an order of said plurality of sequentially-ordered data to be written, said plurality of unallocated storage regions being selected from a plurality of unallocated storage regions designated by said stored allocation status information;

wherein said predetermined condition comprises first and second conditions to be satisfied simultaneously;

wherein said first condition is that said storage region allocated to each of said plurality of sequentially-ordered data to be written belongs to one of said plurality of disc storage devices which is different from any one of first and second disc storage devices, wherein said first disc storage device includes a first storage region which has been allocated to one data within a predetermined number of data preceding said each of said plurality of sequentially-ordered data to be written, said second storage device includes a second storage region which stores error correcting code data belonging to an error correcting data group stored by a group of storage regions to which said first storage region belongs;

wherein said second condition is that a storage region which stores a particular error correcting code data belongs to one of said plurality of storage devices which is different from said first and second disc storage devices, said particular error correcting code data belonging to an error correcting data group which is stored by a group of storage regions including said storage region allocated to said each of said plurality of sequentially-ordered data to be written.

2. A method according to claim 1, wherein said allocating is executed for each of said plurality of sequentially-ordered data to be written, before an operating system issues a write request to said array controller for said each of said plurality of sequentially-ordered data to be written, wherein said operating system is one which controls a computer which uses said disc array.

3. A method according to claim 2, wherein said plurality of sequentially-ordered data to be written includes a plurality of file blocks of a same file.

4. A method according to claim 2, wherein each of said plurality of storage regions has a predetermined sequential logical-block number allocated thereto;

wherein said write request issued by said operating system for each of said plurality of sequentially-ordered data to be written designates a logical-block number allocated to one of said plurality of storage regions of said plurality of disc storage devices, allocated to said each of said plurality of sequentially-ordered data to be written.

5. A method according to claim 1, wherein said predetermined number is one.

6. A method according to claim 5, wherein said allocating step includes a step of allocating to each of said plurality of sequentially-ordered data to be written, an unallocated storage region which satisfies said predetermined condition and another condition simultaneously;

wherein said another condition is that an unallocated storage region allocated to said each of said plurality of sequentially-ordered data belongs to one of said plurality of disc storage devices different from disc storage devices having been allocated to one data within another number of data preceding said each of said plurality of sequentially-ordered data to be written;

wherein said another number is equal to a total number of said plurality of disc storage devices.

7. A method according to claim 1, wherein said predetermined number is dependent upon a total number of said plurality of disc storage devices included in said disc array.

8. A method according to claim 1, wherein said predetermined number is less by one than a maximum integer which does not exceed a ratio of a total number of said plurality of disc storage devices of said disc array to a sum of one and a total number of disc storage devices which store correcting code data belonging to a same error correcting data group.

9. A method according to claim 1,
wherein said allocation status information comprises a plurality of allocation status information each stored in correspondence to one group within a plurality of data storage region groups, each of said plurality of allocation status information designating a plurality of unallocated storage regions for storing data, not allocated to any data, within storage regions for storing data belonging to one data storage region group within said plurality of data storage region groups corresponding to said each of said plurality of allocation status information, wherein each data storage region groups comprises a number of storage regions for storing data which belong to different groups within said plurality of groups of storage regions each for storing either data or error correcting code data, wherein said number of storage regions belonging to each data storage region group belongs to different ones of said plurality of disc storage devices, and a total number of said number of storage regions is equal to a total number of said plurality of disc storage devices;
wherein said allocating comprises the steps of:
dividing said plurality of sequentially-ordered data to be written, into a number of partial data groups each of which comprises a plurality of data equal in number to said plurality of disc storage devices; and
allocating storage regions belonging to a same data storage region group within said plurality of data storage region groups of storage regions, to a plurality of data belonging to a same partial data group within said plurality of partial data groups.

10. A method according to claim 9,
wherein said step of allocating storage regions belonging to a same data storage region group includes a step of selecting, for each of a plurality of data belonging to a same partial data group within said plurality of partial data groups, an unallocated storage region which belongs to one of said plurality of disc storage devices different from disc storage devices to which belong storage regions having been allocated to a number of data preceding said each data of said each partial data group and belonging to said same partial data group within said plurality of partial data groups.

11. A method according to claim 1, further comprising:
dynamically updating said allocation status information, so that said allocation status information designates a storage region having been allocated to data but, thereafter, having been released from allocation to said data, as an unallocated region, at said releasing.

12. A method according to claim 1, further comprising a step of determining an order of allocation of a plurality of storage regions for data within said plurality of disc storage discs, before executing said allocating;
wherein said allocation status information comprises allocation status information designating unallocated storage regions within said plurality of storage regions for data, according to said determined order;
wherein said allocating step comprises a step of sequentially allocating said unallocated storage regions to said plurality of sequentially-ordered data according to an order of destination of said unallocated storage regions by said allocation status information;
wherein said determining step of said order comprises a step of sequentially selecting unallocated storage regions for storing data, so that, after one of said unallocated storage regions for storing data is selected as a preceding storage region for storing data, another unallocated storage region which satisfies a further condition is selected as one succeeding to said one preceding storage region for storing data;
wherein said further condition is that said another storage region for storing data belongs to one of said plurality of disc storage devices which is different from any one of two particular disc storage devices, and that, at the same time, further another storage region for storing error correcting code data belonging to a same group of storage regions to which said succeeding storage region belongs within said plurality of groups of storage regions, belongs to another of said plurality of disc storage devices which is different from said two disc storage devices;
wherein said two disc storage devices comprise one of said plurality of disc storage devices to which said preceding storage region belongs, and another disc storage device which includes a storage region which stores error correcting code data of an error correcting data group stored by a group of storage regions to which said preceding storage region belongs with said plurality of groups of storage regions.

13. A method according to claim 1, wherein said plurality of disc storage devices comprise a RAID (Redundant Arrays of Inexpensive Discs) level 5 disc array.

14. In a disc array which comprises:
a plurality of disc storage devices for storing a plurality of error correcting data groups each comprising a plurality of data and error correcting code data therefor, and
an array controller for controlling execution of data read requests and data write requests for said plurality of disc storage devices,
each disc storage device having a plurality of storage regions each for storing either data or error correcting code data,
a plurality of storage regions included in said plurality of disc storage devices being divided into a plurality of groups of storage regions,
wherein storage regions belonging to each group of storage regions belong to different ones of said plurality of disc devices and store a plurality of data and error correcting code data both belonging to a same error correcting data group, in such a manner that error correcting code data belonging to different error correcting data groups are dispersed in said plurality of disc devices,
a method for allocating one of said plurality of storage regions within said plurality of disc storage devices to data to be written therein, comprising the steps of:
storing allocation status information designating a plurality of unallocated storage regions for storing data, not allocated to any data, within a plurality of storage regions within said plurality of disc storage devices; and
allocating a plurality of unallocated storage regions which satisfies a predetermined condition, to a plurality of sequentially-ordered data to be written, said allocating being executed sequentially according to an order of said plurality of sequentially-ordered data to be written, said plurality of unallocated storage regions being selected from said plurality of unallocated storage regions designated by said stored allocation status information;

wherein said condition is that said storage region allocated to each of said plurality of sequentially-ordered data to be written belongs to one of said plurality of disc storage devices which is different from any one of a group of disc storage devices into which a plurality of data to be written preceding said each data to be written have been written, among said plurality of sequentially-ordered data to be written wherein a total number of said plurality of data to be written preceding said each data to be written is equal to a total number of said plurality of disc storage devices minus one.

15. A method according to claim 14, wherein said allocating is executed for each of said plurality of sequentially-ordered data to be written, before an operating system issues a write request to said array controller for said each of said plurality of sequentially-ordered data, wherein said operating system is one which controls a computer which uses said disc array.

16. A disc array according to claim 14, wherein said plurality of disc storage devices comprise a RAID (Redundant Arrays of Inexpensive Discs) level 5 disc array.

17. In a disc array which comprises:

a plurality of disc storage devices for storing a plurality of error correcting data groups each comprising a plurality of data and error correcting code data therefor, and an array controller for controlling execution of data read requests and data write requests for said plurality of disc storage devices, each disc storage device having a plurality of storage regions each for storing either data or error correcting code data, a plurality of storage regions included in said plurality of disc storage devices being divided into a plurality of groups of storage regions, wherein storage regions belonging to each group of storage regions belong to different ones of said plurality of disc devices and store a plurality of data and error correcting code data both belonging to a same error correcting data group, in such a manner that error correcting code data belonging to different error correcting data groups are dispersed in said plurality of disc devices, said array controller having a circuit for generating error correcting code data from plural data belonging to a same error correcting data group, and for writing said plural data and said generated error correcting code data into said plurality of disc storage devices in parallel;

a method for allocating one of said plurality of storage regions within said plurality of disc storage devices to data to be written therein, comprising the steps of:

forming a plurality of partial data groups from a plurality of sequentially-ordered data to be written, each partial data group comprising a plurality of data equal in number to a total number of data to be included in a same error correcting data group;

selecting a group of unallocated storage regions for each partial data group, said group of unallocated storage regions including ones for storing plural data belonging to a same error correcting data group; and sequentially allocating said unallocated storage regions within said selected group, to a plurality of data within said each partial data group;

wherein said allocating of said unallocated storage regions within said selected group is executed in such a manner that one of said unallocated storage regions of said selected group which belongs to a particular one of said plurality of disc storage devices is first allocated to one of said plurality of data within said each partial data group, wherein said particular disc storage device is one which includes a storage region which stores error correcting code data for another partial data group to which a group of unallocated storage regions have been allocated just before said each partial data group.

18. A method according to claim 17, wherein said allocating is executed for each of said plurality of sequentially-ordered data to be written, before an operating system issues a write request to said array controller for said each of said plurality of sequentially-ordered data, wherein said operating system is one which controls a computer which uses said disc array.

19. A disc array according to claim 17, wherein said plurality of disc storage devices comprise a RAID (Redundant Arrays of Inexpensive Discs) level 5 disc array.

20. In a disc array which comprises:

a plurality of disc storage devices for storing a plurality of error correcting data groups each comprising a plurality of data and error correcting code data therefor, and an array controller for controlling execution of data read requests and data write requests for said plurality of disc storage devices, a plurality of storage regions included in said plurality of disc storage devices being divided into a plurality of groups of storage regions, wherein storage regions belonging to each group of storage regions belong to different ones of said plurality of disc devices and store a plurality of data and error correcting code data both belonging to a same error correcting data group, in such a manner that error correcting code data belonging to different error correcting data groups are dispersed in said plurality of disc devices, said array controller having a circuit for supplying each disc storage device with a write request requesting said each disc storage device to write a plurality of data together;

each disc storage device having a cache memory for temporally storing a plurality of data to be written and a circuit for sequentially writing said plurality of data stored in said cache memory into successive storage regions within said each disc storage device;

a method for allocating one of said plurality of storage regions within said plurality of disc storage devices to data to be written therein, comprising the steps of:

determining a total number of data blocks which can be stored in said cache memory included in each of said plurality of disc storage devices, based upon a size of said cache memory;

dividing a plurality of sequentially-ordered data blocks to be written, into a plurality of groups of sequentially-ordered data blocks, so that a total number of data blocks included in each group within said plurality of group of said sequentially-ordered data blocks does not exceed said determined total number; and allocating a plurality of storage regions located at successive locations within one of said plurality of disc storage devices to data blocks of each group within said plurality of groups of sequentially-ordered data blocks.

21. A method according to claim 20, wherein said allocating is executed for each of said plurality of sequentially-ordered data blocks to be written, before an operating system issues a write request to said array controller for said each of said plurality of sequentially-ordered data blocks, wherein said operating system is one which controls a computer which uses said disc array.

22. A disc array according to claim 20, wherein said plurality of disc storage devices comprise a RAID (Redundant Arrays of Inexpensive Discs) level 5 disc array.

23. In a disc array which comprises:

a plurality of disc storage devices for storing a plurality of error correcting data groups each comprising a plurality of data and error correcting code data therefor, and an array controller for controlling execution of data read requests and data write requests for said plurality of disc storage devices, each disc storage device having a plurality of storage regions each for storing data or error correcting codes, a plurality of storage regions included in said plurality of disc storage devices being divided into a plurality of groups of storage regions, wherein storage regions belonging to each group of storage regions belong to different ones of said plurality of disc devices and store a plurality of data and error correcting code data both belonging to a same error correcting data group, in such a manner that error correcting code data belonging to different error correcting data groups are dispersed in said plurality of disc devices, a method for allocating one of said plurality of storage regions within said plurality of disc storage regions to data to be written therein, comprising the steps of:

storing allocation status information designating a plurality of unallocated storage regions for storing data, not allocated to any data, within a plurality of storage regions within said plurality of disc storage devices; and sequentially allocating a plurality of unallocated storage regions which satisfies a predetermined condition, within a plurality of storage regions as designated by said allocation status information, to a plurality of data supplied sequentially to said array controller;

wherein said predetermined condition comprise first and second conditions to be satisfied simultaneously;

wherein said first condition is that said storage region allocated to each of said plurality of data belongs to one of said plurality of disc storage devices which is different from any one of first and second disc storage devices, wherein said first disc storage device is one which includes a first storage region which has been allocated to one of said plurality of data supplied to array controller just before said each of said plurality of data, wherein said second storage device is one which includes a second storage region which stores error correcting code data belonging to an error correcting data group which are stored by a group of storage regions to which said first storage region belongs;

wherein said second condition is that a particular storage region which stores error correcting code data belongs to one of said plurality of disc storage devices which is different from said first and second disc storage device, wherein said particular storage region is one for storing an error correcting data group which are stored by a group of storage regions which includes said storage region allocated to said each of said plurality of data.

24. A method according to claim 23, wherein said allocating is executed for said plurality of data, according to an order of supply thereof.

25. A method according to claim 23, further comprising the steps of:

sequentially supplying said array controller with said plurality of data from an operating system which controls a computer which uses said disc array;

allocating by said operating system, to each of said plurality of data, a logical storage location into which said each of said plurality of data is to be written;

supplying said array controller with logical storage location information for identifying a logical storage location allocated to each of said plurality of data, at supply of said each of said plurality of data by said supplying step;

storing by said array controller allocation status information for associating said storage region allocated to each of said plurality of data in said allocating step of a storage region, with a logical storage location as identified by said logical storage location information supplied by said operating system for said each of said plurality of data;

said operating system designating by said operating system a logical storage location allocated to data to be accessed, when said operating system is to access said data;

judging by said array controller one of said plurality of storage regions within said plurality of disc storage devices, associated with said logical storage location as designated by said logical storage location information supplied to said array controller; and accessing said judged one storage region by said array controller.

26. A method according to claim 23, wherein said plurality of storage regions within said plurality of disc storage devices are divided into groups, with each group representing storage regions belonging to one of a plurality of logical units; and wherein said plurality of data comprises data to be written into different ones of said plurality of logical units.

27. A method according to claim 23, wherein said allocation status information comprises a plurality of allocation status information each stored in correspondence to one group within a plurality of data storage region groups, each of said plurality of allocation status information designating a plurality of unallocated storage regions for storing data, not allocated to any data, within storage regions for storing data belonging to one data storage region group within said plurality of data storage region groups corresponding to said each of said plurality of allocation status information, wherein each data storage region group comprises a number of storage regions for storing data which belong to different groups within said plurality of groups of storage regions each for storing either data or error correcting code data, wherein said number of storage regions belonging to each data storage region group being to different ones of said plurality of disc devices, a total number of said number of disc storage regions being equal to a total number of said plurality of disc storage devices;

wherein said allocating comprises the steps of:
dividing said plurality of sequentially-ordered data to be written, into a number of partial data groups each of which comprises a plurality of data equal in number to said plurality of disc storage devices; and allocating storage regions belonging to a same data storage region group within said plurality of data storage region groups of storage regions, to a plurality of data belonging to a same partial data group within said plurality of partial data groups.

28. A disc array according to claim 23, wherein said plurality of disc storage devices comprise a RAID (Redundant Arrays of Inexpensive Discs) level 5 disc array.

29. In a disc array which comprises:

a plurality of disc storage devices for storing a plurality of error correcting data groups each comprising a plurality of data and error correcting code data therefor, and an array controller for controlling execution of data read requests and data write requests for said plurality of disc storage devices, each disc storage device having a plurality of storage regions each for storing either data or error correcting code data, a plurality of storage regions included in said plurality of disc storage devices being divided into a plurality of groups of storage regions, wherein storage regions belonging to each group of storage regions belong to different ones of said plurality of disc devices and store a plurality of data and error correcting code data both belonging to a same error correcting data group, in such a manner that error correcting code data belonging to different error correcting data groups are dispersed in said plurality of disc devices;

said array controller having a plurality of request queues each provided in correspondence to one of said plurality of disc storage devices, with each request queue storing write requests and read requests for a corresponding disc storage device;

a method for allocating one of said plurality of storage regions within said plurality of disc storage devices to data to be written therein, comprising the steps of:

storing allocation status information designating a plurality of unallocated storage regions for storing data, not allocated to any data, within a plurality of storage regions within said plurality of disc storage devices; and allocating a plurality of unallocated storage regions which satisfies a predetermined condition, to a plurality of sequentially-ordered data to be written, said allocating being executed sequentially according to an order of said plurality of sequentially-ordered data to be written, said plurality of unallocated storage regions being selected from said plurality of unallocated storage regions designated by said stored allocation status information;

wherein said predetermined condition is that an unallocated first storage region, to be allocated to each of said plurality of sequentially-ordered data to be written, belongs to a first one of said plurality of disc storage devices which has relatively fewer requests waiting for execution in said request queue for said first disc storage device, and that a second storage region for error correcting code data which belongs to a same group of storage regions as said unallocated first storage region belongs to a second one of said plurality of disc storage devices which has relatively fewer requests waiting for execution in said request queue for said second disc storage device.

30. A method according to claim 29, wherein said allocating is executed for each of said plurality of sequentially-ordered data to be written, before an operating system issues a write request to said array controller for said each of said plurality of sequentially-ordered data, wherein said operating system is one which controls a computer which uses said disc array.

31. A method according to claim 29, wherein said allocating is executed sequentially for said plurality of sequentially-ordered data according to an order of supply thereof.

32. A method according to claim 31, further comprising the steps of:

sequentially supplying said array controller with said plurality of data from an operating system which controls a computer which uses said disc array;

allocating by said operating system, to each of said plurality of data, a logical storage location into which said each of said plurality of data is to be written;

supplying said array controller with logical storage location information for identifying a logical storage location allocated to each of said plurality of data, during the supply of said each of said plurality of data by said supplying step;

storing by said array controller allocation status information for associating said storage region allocated to each of said plurality of data in said allocating step of a storage region, with a logical storage location as identified by said logical storage location information supplied by said operating system for said each of said plurality of data;

designating by said operating system a logical storage location allocated to data to be accessed, when said operating system is to access said data;

judging by said array controller one of said plurality of storage regions within said plurality of disc storage devices, associated with said logical storage location as designated by said logical storage location information supplied to said array controller; and accessing said judged one storage region by said array controller.

33. A disc array according to claim 29, wherein said plurality of disc storage devices comprise a RAID (Redundant Arrays of Inexpensive Discs) level 5 disc array.

34. In a disc array which comprises:

a plurality of disc storage devices for storing a plurality of error correcting data groups each comprising a plurality of data and error correcting code data therefor, and an array controller for controlling execution of data read requests and data write requests for said plurality of disc storage devices, each disc storage device having a plurality of storage regions each for storing either data or error correcting code data, a plurality of storage regions included in said plurality of disc storage devices being divided into a plurality of groups of storage regions, wherein storage regions belonging to each group of storage regions belong to different ones of said plurality of disc devices and store a plurality of data and error correcting code data both belonging to a same error correcting data group, in such a manner that error correcting code data belonging to different error correcting data groups are dispersed in said plurality of disc devices, a method for accessing said disc array, comprising the steps of:

(a) sequentially executing a plurality of write requests each issued by an upper apparatus connected to said disc array and each designating one of a plurality of sequentially-ordered data, wherein said executing includes accessing, for each of said write requests, one storage region which stores data designated by said each write request, and accessing, for said each write request, another storage region which stores error correcting code data, within a same group of storage regions to which said first storage region belongs;

(b) controlling execution of said step (a), so that execution of a succeeding one of two write requests sequentially supplied by said upper apparatus is started in parallel to execution of a preceding one of said two write requests;

wherein a first storage region group is predetermined so as to be different from a second storage region group, wherein said first storage region group includes a first storage region which stores a succeeding one of two arbitrary successive data within said sequentially-ordered data and a second storage region which stores error correcting code data for said succeeding data, wherein said second storage region group includes a third storage region which stores a preceding one of said two arbitrary successive data and a fourth storage region which stores error correcting code data for said succeeding data;

wherein any one of two of said plurality of disc storage devices which respectively includes said first and second storage regions are predetermined so as to be different from any of two of said plurality of disc storage devices which respectively includes said third and fourth storage regions.

35. A method according to claim 34, further comprising the steps of:

(c) responsive to each of a plurality of read requests each issued by said upper apparatus and each designating one of said plurality of sequentially-ordered data, reading said data designated by said each read request from a storage region which has been allocated to said data;

(d) controlling execution of said step (c), so that execution of said step (c) is started for a succeeding one of two arbitrary read requests sequentially supplied by said upper apparatus, in parallel to execution of said step (c) for a preceding one of said two write requests;

wherein a plurality of storage regions within said plurality of disc storage devices which store said plurality of sequentially-ordered data are predetermined so that a plurality of storage regions within said plurality of disc storage devices which store a predetermined number of successive data among said plurality of sequentially-ordered data belong to mutually different ones of said plurality of disc storage devices, wherein said predetermined number is equal to a total number of said disc storage devices.

36. A disc array according to claim 34, wherein said plurality of disc storage devices comprise a RAID (Redundant Arrays of Inexpensive Discs) level 5 disc array.

37. In a disc array which comprises:

a plurality of disc storage devices for storing a plurality of error correcting data groups each comprising a plurality of data and error correcting code data therefor, and an array controller for controlling execution of data read requests and data write requests for said plurality of disc storage devices, each disc storage device having a plurality of storage regions each for storing either data or error correcting code data, a plurality of storage regions included in said plurality of disc storage devices being divided into a plurality of groups of storage regions, wherein storage regions belonging to each group of storage regions belong to different ones of said plurality of disc devices and store a plurality of data and error correcting code data both belonging to a same error correcting data group, in such a manner that error correcting code data belonging to different error correcting data groups are dispersed in said plurality of disc devices, a method of accessing said disc array, comprising the steps of:

(a) responsive to each of a plurality of read requests each issued by said upper apparatus and each designating one of said plurality of sequentially-ordered data, reading said data designated by said each read request from a storage region which has been allocated to said data;

(b) controlling execution of said step (a), so that execution of said step (a) is started for a succeeding one of two arbitrary read requests sequentially supplied by said upper apparatus, in parallel to execution of said step (a) for a preceding one of said two write requests;

wherein a plurality of storage regions within said plurality of disc storage devices which store said plurality of sequentially-ordered data are predetermined so that a plurality of storage regions within said plurality of disc storage devices which store a predetermined number of successive data among said plurality of sequentially-ordered data belong to mutually different ones of said plurality of disc storage devices, wherein said predetermined number is equal to a total number of said disc storage devices.

38. A disc array according to claim 37, wherein said plurality of disc storage devices comprise a RAID (Redundant Arrays of Inexpensive Discs) level 5 disc array.

* * * * *